US009533665B2

(12) United States Patent
Nimura et al.

(10) Patent No.: US 9,533,665 B2
(45) Date of Patent: Jan. 3, 2017

(54) BRAKE DEVICE FOR VEHICLE

(71) Applicants: Kazunori Nimura, Toki (HK); Hiroshi Nakaoka, Okazaki (JP)

(72) Inventors: Kazunori Nimura, Toki (HK); Hiroshi Nakaoka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/889,737

(22) PCT Filed: May 8, 2013

(86) PCT No.: PCT/JP2013/062923
§ 371 (c)(1),
(2) Date: Nov. 6, 2015

(87) PCT Pub. No.: WO2014/181397
PCT Pub. Date: Nov. 13, 2014

(65) Prior Publication Data
US 2016/0121868 A1 May 5, 2016

(51) Int. Cl.
*B60T 8/34* (2006.01)
*B60T 13/68* (2006.01)
(Continued)

(52) U.S. Cl.
CPC .............. *B60T 13/686* (2013.01); *B60T 7/042* (2013.01); *B60T 8/38* (2013.01); *B60T 8/4081* (2013.01);
(Continued)

(58) Field of Classification Search
CPC .............. B60T 7/02; B60T 8/38; B60T 13/58; B60T 13/662; B60T 13/686
(Continued)

(56) References Cited

U.S. PATENT DOCUMENTS

2003/0020327 A1* 1/2003 Isono .................... B60T 8/4081
303/113.4
2007/0114837 A1* 5/2007 Kusano .................. B60T 7/042
303/10
(Continued)

FOREIGN PATENT DOCUMENTS

DE 10 2011 005 754 A1 9/2012
JP 5-92035 12/1993
(Continued)

OTHER PUBLICATIONS

Extended European Search Report issued Mar. 21, 2016 in Patent Application No. 13884320.6.
(Continued)

*Primary Examiner* — Christopher Schwartz
(74) *Attorney, Agent, or Firm* — Oblon, McClelland, Maier & Neustadt, L.L.P.

(57) ABSTRACT

A master cylinder includes pressurizing chambers and atmospheric pressure chambers which are in communication with a reservoir provided upstream. The pressurizing chambers of the master cylinder are connected to a brake fluid pressure control valve device through master pressure pipes provided with master cut valves. The atmospheric pressure chambers of the master cylinder bypass the master cut valves and are connected to the brake fluid pressure control valve device through bypass pipes provided with check valves. A pump constituting a brake fluid pressurizing section of the brake hydraulic control valve device suctions the brake fluid from the reservoir preferentially through the bypass pipes provided with the check valves and pressurizes the brake fluid to supply a brake fluid pressure to brake fluid pressure adjust sections.

9 Claims, 9 Drawing Sheets

(51) Int. Cl.
  *B60T 7/04* (2006.01)
  *B60T 13/14* (2006.01)
  *B60T 13/66* (2006.01)
  *B60T 8/38* (2006.01)
  *B60T 8/40* (2006.01)
  *B60T 13/58* (2006.01)

(52) U.S. Cl.
  CPC .............. *B60T 13/146* (2013.01); *B60T 13/58* (2013.01); *B60T 13/662* (2013.01); *B60T 2270/604* (2013.01)

(58) Field of Classification Search
  USPC ....... 303/10, 11, 6.01, 113.1–113.4, 114.1, 303/116.1–116.4, 152, 155
  See application file for complete search history.

(56) References Cited

U.S. PATENT DOCUMENTS

2007/0289827 A1* 12/2007 Isono ................. B60T 8/38 188/358

2009/0212621 A1* 8/2009 Drott ................. B60T 8/38 303/14
2011/0254358 A1   10/2011 Strengert et al.
2012/0062023 A1   3/2012 Ohkubo et al.
2012/0256477 A1* 10/2012 Miyazaki ............ B60T 8/4081 303/6.01

FOREIGN PATENT DOCUMENTS

| JP | 2001-315628 A | 11/2001 |
| JP | 2012-512777 A | 6/2012 |
| WO | 2010/119889 A1 | 10/2010 |
| WO | 2012/105526 A1 | 8/2012 |
| WO | WO 2012/143312 A1 | 10/2012 |

OTHER PUBLICATIONS

International Search Report Issued Jul. 2, 2013 in PCT/JP13/62923 Filed May 8, 2013.

* cited by examiner

BRAKE DEVICE FOR VEHICLE

TECHNICAL FIELD

The present invention relates to a brake device for a vehicle, comprising:
a master cylinder for generating a fluid pressure depending on an operation of a brake pedal by a driver;
a power-driven type fluid pressure source for generating a fluid pressure by a drive using a predetermined power and supplying a fluid pressure adjusted depending on the operation of the brake pedal;
a reservoir for reserving an operation fluid, the reservoir being in communication with upstream sides of the master cylinder and the power-driven type fluid pressure source;
wheel cylinders for applying braking forces to vehicle wheels of the vehicle, respectively downstream of the master cylinder and the power-driven type fluid pressure source;
a fluid pressure control valve mechanism for independently controlling fluid pressures in the wheel cylinders by activation of open-and-close valves and pumps, the fluid pressure control valve mechanism being provided between the master cylinder and the wheel cylinders and between the power-driven type fluid pressure source and the wheel cylinders; and
control means for controlling at least activations of the power-driven type fluid pressure source and the fluid pressure control valve mechanism.

BACKGROUND ART

Recently, this type of the brake device for the vehicle has been positively proposed. For example, in a BBW type brake device disclosed in Patent Literature 1 described below, a slave cylinder generates a brake fluid pressure electrically depending on an operation amount of the brake pedal, and this brake fluid pressure is supplied to the wheel cylinders provided for the vehicle wheels, respectively through a VSA device (i.e., brake fluid pressure control means) to allow a smooth braking by the wheel cylinders with the non-pulsing brake fluid pressure pressurized by the slave cylinder. Further, in this conventional BBW type brake device, when the VSA device (i.e., brake fluid pressure control means) controls the brake fluid pressure to be supplied to the wheel cylinders independently to control a behavior of the vehicle, the slave cylinder is configured to generate the brake fluid pressure depending on a sum of brake fluid pressures required for the wheel cylinders to generate an appropriate brake fluid pressure.

CITATION LIST

Patent Literature

Patent Literature 1: WO 2010/119889 A1

SUMMARY OF THE INVENTION

The VSA device (i.e., brake fluid pressure control means), i.e., a fluid pressure control valve mechanism provided in the conventional BBW type brake device operates automatically to control the brake fluid pressure in each of the wheel cylinders to stabilize the behavior of the vehicle regardless of whether the driver operates the brake pedal. In the conventional brake device, mainly, the slave cylinder (i.e. a power-driven type fluid pressure source) activates, however, in general, according to such a control of the brake fluid pressures in the wheel cylinders, a pump provided in the VSA device (i.e., brake fluid pressure control means), i.e., the fluid pressure control valve mechanism automatically suctions and pressurizes the suctioned operation fluid and the pressurized operation fluid (i.e., the brake fluid pressure) is supplied to the wheel cylinders through various open-and-close valves.

In this connection, when the pump of the VSA device provided downstream of the master cylinder and the slave cylinder (i.e., a power-driven type fluid pressure source) pressurizes and discharges the operation fluid, the pump needs to suction the operation fluid from a reservoir for reserving the operation fluid. In this case, in general, the reservoir is connected communicatively to the master cylinder and thus, as in the conventional brake device, normally, in case that the brake fluid pressure pressurized by the slave cylinder (i.e., the power-driven type fluid pressure source) is used, it is necessary to suction the operation fluid through a master cut valve (i.e., a shut-off valve) for permitting or shutting off the communication between the master cylinder and the VSA device. In this case, even when a state of the master cut valve is maintained at an open state, a flow resistance is large when the operation fluid passes through a valve part and as a result, it is difficult for the pump of the VSA device to smoothly suction and thus, it may be difficult to quickly supply the pressurized operation fluid to the wheel cylinders.

The present invention is made for solving the problem described above and the object of the present invention is to provide a brake device for a vehicle in which the pump provided in the fluid pressure control valve mechanism can suction the operation fluid smoothly from the reservoir provided at the side of the master cylinder and pressurize the suctioned operation fluid to supply the pressurized operation fluid quickly to the wheel cylinders.

The brake device for the vehicle according to the present invention for achieving the object described above comprises a master cylinder, a power-driven type fluid pressure source, a reservoir, wheel cylinders, a fluid pressure control valve mechanism and control means.

The master cylinder generates a fluid pressure depending on an operation of a brake pedal by a driver. The power-driven type fluid pressure source generates a fluid pressure by a drive using a predetermined power (for example, a motor or the like) and supplies the fluid pressure adjusted depending on the operation of the brake pedal. The reservoir reserves an operation fluid therein and is in communication with upstream sides of the master cylinder and the power-driven type fluid pressure source. The wheel cylinders apply braking forces to vehicle wheels of the vehicle, respectively downstream of the master cylinder and the power-driven type fluid pressure source. The fluid pressure control valve mechanism is provided between the master cylinder and the wheel cylinders and between the power-driven type fluid pressure source and the wheel cylinders and controls the fluid pressures of the wheel cylinders independently by activations of open-and-close valves and pumps. The control means controls at least activations of the power-driven type fluid pressure source and the fluid pressure control valve mechanism.

The brake device for the vehicle according to the present invention is characterized in that a shut-off valve is provided in a connection passage for connecting the master cylinder to the fluid pressure control valve mechanism, a state of the shut-off valve being changed to a closed state for shutting off a flow of the operation fluid from the master cylinder to the fluid pressure control valve mechanism by the control means when the brake pedal is operated and being changed to an open state for permitting the flow of the operation fluid from the master cylinder to the fluid pressure control valve mechanism by the control means when the brake pedal is not operated, and a bypass passage is provided in communication with the reservoir from the fluid pressure control valve mechanism bypassing the shut-off valve and includes a one-way valve for permitting only a flow in one direction from the side of the reservoir to the side of the fluid pressure control valve mechanism.

Accordingly, during a non-operation where the driver does not operate the brake pedal, for example, the pump of the fluid pressure control valve mechanism can suction the operation fluid, which is reserved in the reservoir provided upstream of the master cylinder, through the connection and bypass passages and pressurize the suctioned operation fluid to automatically apply braking forces to the vehicle wheels, respectively to stabilize a behavior of the vehicle. In particular, the pump of the fluid pressure control valve mechanism can suction the operation fluid preferentially through the bypass passage provided with the one-way valve, compared with the connection passage provided with the shut-off valve under the open state and pressurize quickly the suctioned operation fluid to supply the operation fluid to the wheel cylinders.

In other words, the state of the shut-off valve provided in the connection passage needs to be switched quickly between the closed and open states depending on whether the brake pedal is operated and thus, even in case that the state of the shut-off valve is maintained at the open state, a large flow resistance occurs when the operation fluid flows through a narrow gap in the valve part. In other words, the shut-off valve under the open state is likely to act as a so-called orifice. Therefore, the pump is unlikely to suction a sufficient amount of the operation fluid smoothly through the connection passage. On the other hand, the one-way valve provided in the bypass passage permits only the flow of the operation fluid from the reservoir to the fluid pressure control valve mechanism and thus, when the state of the one-way valve becomes the open state due to the suction by the pump, the operation fluid can flow with a small flow resistance. Therefore, the pump can suction a sufficient amount of the operation fluid smoothly through the bypass passage and as a result, the pressurized operation fluid, i.e., the pressurized fluid pressure can be supplied quickly to the wheel cylinders to apply braking forces to the vehicle wheels, respectively.

In this case, the connection passage is provided corresponding to each of brake systems for supplying the operation fluid to the wheel cylinders provided corresponding to the vehicle wheels of the vehicle, while the bypass passage is provided corresponding to each of the connection passages provided corresponding to each of the brake systems and can become in communication with respective fluid chambers defined by a partition wall in the reservoir. Thereby, the connection passages and the bypass passages can be provided corresponding to the brake systems, respectively. In addition, the bypass passages can become in communication independently with the fluid chambers defined by the partition wall in the reservoir, respectively.

Thereby, even when a problem such as a fluid leakage occurs in a part of the connection passages and the bypass passages downstream of the one-way valve, the pump of the fluid pressure control valve mechanism can suction the operation fluid through the bypass or connection passages where a problem such as a fluid leakage does not occur (in particular, preferentially through the bypass passages) and pressurize the suctioned operation fluid. Therefore, a redundancy can be provided and even when the problem occurs, the pressurized operation fluid can be supplied appropriately to the wheel cylinders to apply braking forces to the vehicle wheels, respectively.

Further, in these cases, the master cylinder may include a pressurizing chamber for pressurizing the operation fluid by a pressurizing piston in conjunction with the operation of the brake pedal and an atmospheric pressure chamber formed by the pressurizing piston for maintaining a pressure of the operation fluid at the atmospheric pressure, the connection passage may be configured to include the pressurizing chamber of the master cylinder which is in communication with the reservoir when the brake pedal is not operated, and the bypass passage may be configured to include the atmospheric pressure chamber of the master cylinder which is in communication with the reservoir regardless of whether the brake pedal is operated.

Thereby, at least when the brake pedal is not operated, the connection passage can be in communication with the reservoir through the pressurizing chamber of the master cylinder and the bypass passage can be in communication with the reservoir through the atmospheric pressure chamber of the master cylinder. Therefore, the pump of the fluid pressure control valve mechanism can suction the operation fluid surely through the connection and bypass passages (in particular, preferentially through the bypass passages) and pressurize the suctioned operation fluid when the brake pedal is not operated.

In these cases, the power-driven type fluid pressure source may be connected to a recirculation passage for recirculating the operation fluid to the reservoir due to a pressure adjustment depending on the operation of the brake pedal and the bypass passage may be configured to include the recirculation passage. In this case, the recirculation passage may be configured to be in communication with one fluid chamber defined by the partition wall in the reservoir.

Thereby, the bypass passage can be in communication with the reservoir through the recirculation passage which is in communication with the fluid chamber defined by the partition wall in the reservoir. Therefore, the pump of the fluid pressure control valve mechanism can suction the operation fluid preferentially through the bypass passage including the recirculation passage and pressurize the suctioned operation fluid when the brake pedal is not operated.

In this regard, when the connection passages and the bypass passages can be provided corresponding to the brake systems, respectively, for example, a combination of the bypass passage configured to include the atmospheric pressure chamber of the master cylinder described above and the bypass passage configured to include the recirculation passage may be provided. In this manner, the bypass passage is in communication with the reservoir through a different passage and thus, for example, the combination of the bypass passage configured to include the recirculation passage can ensures a redundancy surely, compared with a case that all of the bypass passages are configured to include the atmospheric pressure chamber of the master cylinder, in other words, compared with a case that all of the bypass passages are in communication with the reservoir through the master cylinder. As a result, when the brake pedal is not operated, the pump of the fluid pressure control valve mechanism can suction the operation fluid surely through the bypass passage and supply the pressurized operation fluid to the wheel cylinders to apply braking forces to the vehicle wheels, respectively.

In this manner, for example, the combination of the bypass passage configured to include the recirculation passage can reduce the number of the bypass passages configured to include the atmospheric pressure chamber of the master cylinder. Thereby, for example, even when the master cylinder conventionally mounted in many vehicles is used (or diverted), the bypass passage can be formed easily and appropriately and the pump of the fluid pressure control valve mechanism can suction the operation fluid smoothly and pressurize the suctioned operation fluid. Therefore, an increasing of a cost for using (or diverting) the conventional master cylinder can be suppressed.

Further, in these cases, a state of the one-way valve may become a closed state when a spherical valve body seats on a valve seat and become an open state when the valve body displaces away from the valve seat and may be provided such that the valve body seats on the valve seat by the gravity. Thereby, when the driver operates the brake pedal, the fluid pressure control valve mechanism does not suction the operation fluid and thus, the valve body can seat on the valve seat by the gravity to maintain the state of the valve body of the one-way valve at the closed state. Therefore, when the brake pedal is operated and the power-driven type fluid pressure source adjusts the pressure of the operation fluid to supply the operation fluid to the fluid pressure control valve mechanism, the one-way valve, the state of which is maintained at the closed state, can prevent the operation fluid surely from flowing to the side of the master cylinder through the bypass passage.

On the other hand, when the driver does not operate the brake pedal, the pump of the fluid pressure control valve mechanism suctions the operation fluid and thus, the valve body of the one-way valve can displace away from the valve seat against the gravity by the suction force of the pump to change the state of the valve body to the open state. Therefore, when the pump of the fluid pressure control valve mechanism suctions the operation fluid from the reservoir, the operation fluid can flow smoothly toward the fluid pressure control valve mechanism through the one-way valve under the open state and the bypass passage.

DESCRIPTION OF THE PREFERRED EMBODIMENTS a. First Embodiment

Figure 1:
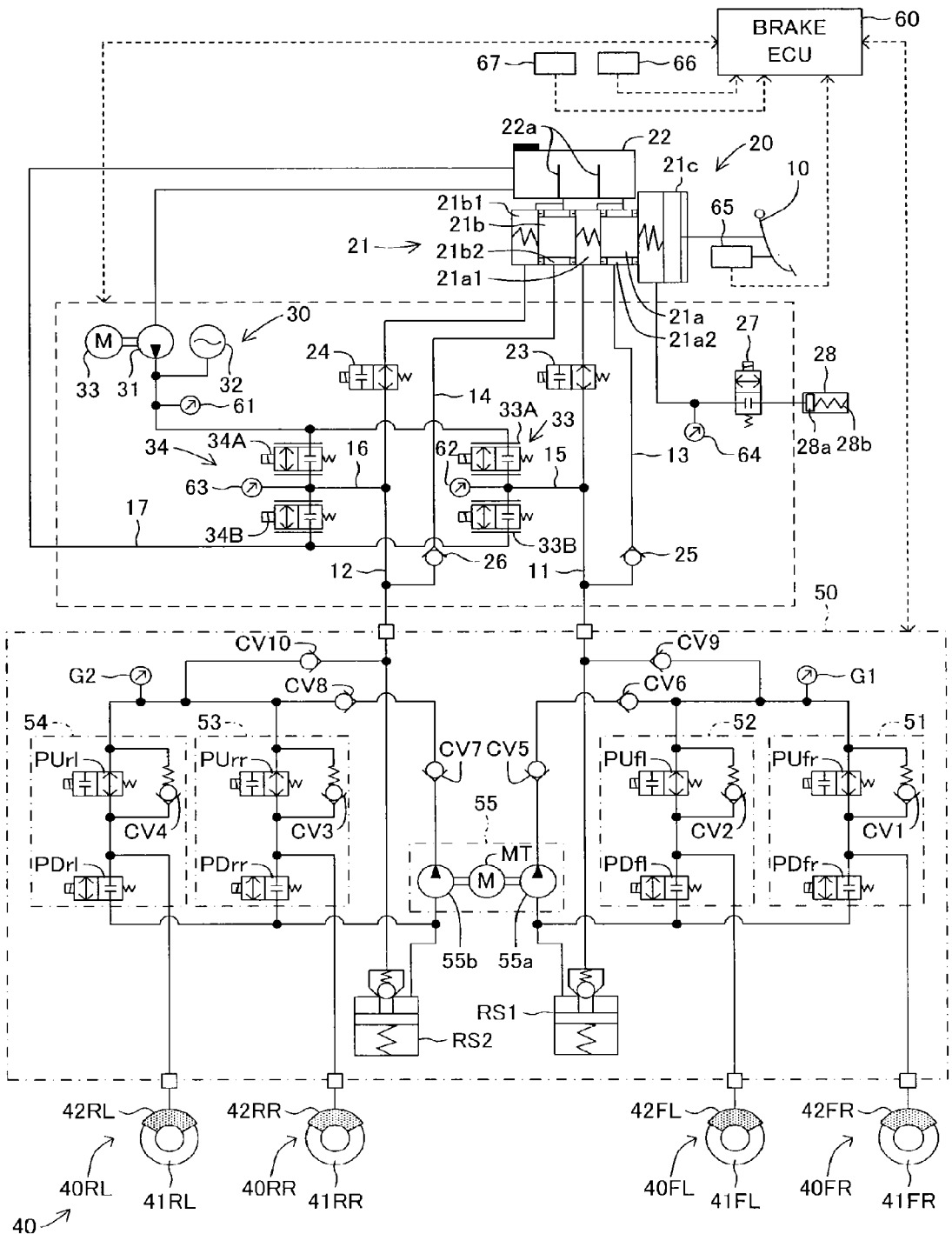
FIG. 1 illustrates a schematic system view of a brake device for a vehicle according to a first embodiment of the present invention.

Below, with reference to the drawings, a brake device for a vehicle according to embodiments of the present invention will be described. FIG. 1 illustrates a schematic system view of a brake device for a vehicle according to a first embodiment. The brake device for the vehicle is configured to include a brake pedal 10, a master cylinder unit 20 serving as a regenerative actuator, a brake fluid pressure generation device 30 serving as a regenerative actuator, a brake unit 40, a brake fluid pressure control valve device 50 serving as a brake fluid pressure control actuator and a brake ECU 60 for managing a brake control.

The master cylinder unit 20 includes a master cylinder 21 and a reservoir 22. As illustrated in FIG. 1, the master cylinder 21 is a tandem type master cylinder having pressurizing pistons 21a and 21b. The master cylinder 21 includes a brake booster 21c. A pedal depression force input to the brake booster 21c by a depression operation of the brake pedal 10 (hereinafter, this depression operation will be also referred to as the brake operation) subject to a booster effect of the brake booster 21c causes the pressurizing pistons 21a and 21b to advance, and fluid pressures of brake fluids (i.e., the operation fluid) (hereinafter, the fluid pressure will be also simply referred to as the brake fluid pressures) in pressurizing chambers 21a1 and 21b1 formed by the pressurizing pistons 21a and 21b are boosted, respectively by a predetermined boost ratio. The pressurizing chamber 21a1 becomes in communication with the brake fluid pressure control valve device 50 described later in detail through a master pressure pipe 11 as a connection passage and the pressurizing chamber 21b1 becomes in communication with the brake fluid pressure control valve device 50 described later in detail through a master pressure pipe 12 as a connection passage.

The master pressure pipe 11 is provided at an intermediate portion thereof with a master cut valve 23 as a cut-off valve which is a 2-ports-2-positions switching type normally-open electromagnetic open-and-close valve and the master pressure pipe 12 is provided at an intermediate portion thereof with a master cut valve 24 as a cut-off valve which is a 2-ports-2-positions switching type normally-open electromagnetic open-and-close valve. A state of each of the master cut valves 23 and 24 is maintained at an open state by a biasing force of a spring when a solenoid is not energized. The state of each of the master cut valves 23 and 24 becomes a closed state only when the solenoid is energized. In this manner, the master cut valves 23 and 24 are provided ad thus, when the master cut valves 23 and 24 are under the closed states, respectively, a communication between the master cylinder 21 and the brake fluid pressure control valve device 50 is shut off by the master cut valves 23 and 24 to prohibit the brake fluid from flowing and thereby, the brake fluid pressure is not transmitted. On the other hand, when the master cut valves 23 and 24 are under the open states, respectively, the communication between the master cylinder 21 and the brake fluid pressure control valve device 50 is permitted to permit the brake fluid to flow and thereby, the brake fluid pressure is transmitted.

In addition, the reservoir 22 for reserving the brake fluid is provided upstream of the master cylinder 21. As illustrated in FIG. 1, an interior of the reservoir 22 is partitioned into fluid chambers (in FIG. 1, three fluid chambers) by partition walls 22a and the brake fluid is reserved in each of the fluid chambers. Thereby, in the master cylinder 21, when the brake operation of the brake pedal 10 by the driver is released and thus, the pressurizing pistons 21a and 21b are retracted (i.e., when the brake pedal 10 is not operated), the pressurizing chambers 21a1 and 21b1 become in communication with the fluid chambers defined in the reservoir 22, respectively. That is, in this case, the pressurizing chamber 21a1 of the master cylinder 21, in other words, the reservoir 22 becomes in communication with the brake fluid pressure control valve device 50 through the master pressure pipe 11 and the master cut valve 23 and the pressurizing chamber 21b1 of the master cylinder 21, in other words, the reservoir 22 becomes in communication with the brake fluid pressure control valve device 50 through the master pressure pipe 12 and the master cut valve 24.

Further, as illustrated in FIG. 1, in the master cylinder 21, an atmospheric pressure chamber 21a2 is formed by a pair of annular cup seals provided on an outer peripheral surface of the pressurizing piston 21a and an atmospheric pressure chamber 21b2 is formed by a pair of annular cup seals provided on an outer peripheral surface of the pressurizing piston 21b. The atmospheric pressure chambers 21a2 and 21b2 are normally in communication with the reservoir 22 to maintain the pressure of the brake fluid at the atmospheric pressure regardless of whether the pressurizing pistons 21a and 21b have advanced or retracted (i.e., whether the brake pedal 10 is operated). The atmospheric pressure chamber 21a2 is connected to the master pressure pipe 11 through a bypass pipe 13 as a bypass passage for bypassing the master cut valve 23 and the atmospheric pressure chamber 21b2 is connected to the master pressure pipe 12 through a bypass pipe 14 as a bypass passage for bypassing the master cut valve 24.

As illustrated in FIG. 1, the bypass pipe 13 is provided with a check valve 25 as a one-way valve and the bypass pipe 14 is provided with a check valve 26 as a one-way valve. The check valve 25 permits only a flow of the brake fluid from the master cylinder 21, in particular, the reservoir 22 to the brake fluid pressure control valve device 50 through the bypass pipe 13 and prohibits the flow of the brake fluid from the brake fluid pressure control valve device 50 to the master cylinder 21 through the bypass pipe 13. The check valve 26 permits only a flow of the brake fluid from the master cylinder 21, in particular, the reservoir 22 to the brake fluid pressure control valve device 50 through the bypass pipe 14 and prohibits the flow of the brake fluid from the brake fluid pressure control valve device 50 to the master cylinder 21 through the bypass pipe 14.

Note that as illustrated in FIG. 1, a stroke simulator 28 is connected to the master cylinder 21 (in particular, the booster 21c assembled to the master cylinder 21) through a simulator cut valve 27 which is a 2-ports-2-positions switching type normally-closed electromagnetic open-and-close valve. The stroke simulator 28 has a piston 28a and a spring 28b and introduces thereinto the brake fluid having an amount depending on a brake operation amount of the brake pedal 10 by the driver when the master cut valves 23 and 24 are under the closed state and the simulator cut valve 27 is under the open state. Along with the introduction of the brake fluid into the stroke simulator 28, the stroke simulator 28 moves the piston 28a against a biasing force of the spring 28b to allow a stroke operation of the brake pedal 10 by the driver and generate a reaction force depending on the brake operation amount to improve a brake operation feeling of the driver.

The brake fluid pressure generation device 30 as a power-driven type fluid pressure source has a pressurizing pump 31 and an accumulator 32. An inlet of the pressurizing pump 31 is connected to the reservoir 22 provided upstream of the pressurizing pump 31 and an outlet of the pressurizing pump 31 is connected to the accumulator 32. The pressurizing pump 31 pressurizes the brake fluid by driving a motor 33 as a predetermined power. Note that in this case, in place of or in addition to the use of the motor 33 as a predetermined power, for example, a driving force of an internal combustion engine can be used. The accumulator 32 converts a pressure energy of the brake fluid pressurized by the pressurizing pump 31 into a pressure energy of a filling gas such as a nitrogen and stores the pressure energy. Although the illustration is omitted, the accumulator 32 is connected to a relief valve provided in the master cylinder unit 20 and returns the brake fluid to the fluid chamber defined in the reservoir 22 through the relief valve when the pressure in the accumulator 32, that is, the brake fluid pressure becomes equal to or higher than a predetermined pressure.

The accumulator 32 is connected to the master pressure pipe 11 downstream of the master cut valve 23 through an accumulator pressure pipe 15 and is connected to the master pressure pipe 12 downstream of the master cut valve 24 through an accumulator pressure pipe 16. In this regard, the accumulator pressure pipe 15 is provided at an intermediate portion thereof with a linear control valve mechanism 33 for adjusting the brake fluid pressure and the accumulator pressure pipe 16 is provided at an intermediate portion thereof with a linear control valve mechanism 34 for adjusting the brake fluid pressure. The linear control valve 33 interposed in the accumulator pressure pipe 15 is comprised of a booster linear control valve 33A and a decompression linear control valve 33B and the linear control valve 34 interposed in the accumulator pressure pipe 16 is comprised of a booster linear control valve 34A and a decompression linear control valve 34B. Each of the booster linear valves 33A and 34A and the decompression linear control valves 33B and 34B is a normally-closed electromagnetic linear control valve, a state of which is maintained at a closed state by a biasing force of a spring when a solenoid is not energized and a valve opening degree of which increases as an amount of an electric power (or a current value) supplied to the solenoid increases. Note that as illustrated in FIG. 1, the decompression linear control valves 33B and 34B are connected to a reservoir pipe 17 as a recirculation passage for recirculating the brake fluid, the recirculation passage 17 being in communication with the fluid chamber defined in the reservoir 22 of the master cylinder unit 20.

In this regard, although the detailed descriptions will be omitted, a state of each of the booster linear control valves 33A and 34A and the decompression linear control valves 33B and 34B is maintained at a closed state by a closing force corresponding to a difference between a spring force of an incorporated spring for biasing a valve body in a closing direction and a difference pressure between primary and secondary pressures for biasing the valve body in an opening direction, the primary pressure being a relatively high pressure of the brake fluid at an inlet of the valve and the secondary pressure being a relatively low pressure of the brake fluid at an outlet of the valve. On the other hand, each of the booster linear control valves 33A and 34A and the decompression linear control valves 33B and 34B is opened at an opening degree depending on a balance of a force acting on the valve body when an electromagnetic attraction force generated by energizing the solenoid and acting in a direction of opening the valve body exceeds the closing force, that is, when a condition that the electromagnetic attraction force>the closing force (=the spring force−difference pressure) is satisfied. Therefore, an opening degree of each of the booster linear control valves 33A and 34A and the decompression linear control valves 33B and 34B can be adjusted depending on the difference pressure, that is, the difference between the primary (or inlet-side) and secondary (or outlet-side) pressures by controlling the amount of the electric power (or the current value) supplied to the solenoid.

As illustrated in FIG. 1, the brake unit 40 is comprised of brake units 40FR, 40FL, 40RR and 40RL each provided corresponding to each of vehicle wheels of the vehicle. Note that in the following description, a reference symbols denoting respective elements provided corresponding to the respective vehicle wheels are accompanied by a symbol FR for a right front vehicle wheel, a symbol FL for a left front vehicle wheel, a symbol RR for a right rear vehicle wheel and a symbol RL for a left rear vehicle wheel, however, when it is not necessary to specify a position of the vehicle wheel, the symbols FR, FL, RR and RL will be omitted. The brake unit 40FR provided for the corresponding vehicle wheel has a brake rotor 41FR and a wheel cylinder 42FR incorporated in a brake caliper. The brake unit 40FL provided for the corresponding vehicle wheel has a brake rotor 41FL and a wheel cylinder 42FL incorporated in a brake caliper. The brake unit 40RR provided for the corresponding vehicle wheel has a brake rotor 41RR and a wheel cylinder 42RR incorporated in a brake caliper. The brake unit 40RL provided for the corresponding vehicle wheel has a brake rotor 41RL and a wheel cylinder 42RL incorporated in a brake caliper. Note that each of the brake units 40 provided corresponding to four vehicle wheels, respectively is not limited to a disc brake type and for example, may be a drum brake type. Further, a combination of the disc brake type and the drum brake type may be employed and for example, each of the brake units 40 provided corresponding to the front vehicle wheels may be a disc brake type and each of the brake units 40 provided corresponding to the rear vehicle wheels may be a drum brake type.

The wheel cylinders 42FR, 42FL, 42RR and 42RL are connected to the brake fluid pressure control valve device 50 and the brake fluid, that is, the brake fluid pressure supplied through the brake fluid pressure control valve device 50 is transmitted to the wheel cylinders 42FR, 42FL, 42RR and 42RL. The brake fluid pressure transmitted (or supplied) through the brake fluid pressure control valve device 50 causes brake pads to be pressed on the respective brake rotors 41FR, 41FL, 41RR and 41RL rotating along with the respective vehicle wheels to apply a braking force to the respective vehicle wheels.

In this regard, the brake device for the vehicle according to the present embodiment has, as fluid pressure sources for applying the brake fluid pressure to the wheel cylinders 42 through the brake fluid pressure control valve device 50, the master cylinder 21 for generating the brake fluid pressure using the pedal depression force input by the driver through the brake pedal 10, the power fluid pressure generation device 30 for applying the fluid pressure using the electric power independently of the master cylinder 21, and a brake fluid pressurizing section 55 described later provided in the brake fluid pressure control valve device 50 independently of the master cylinder 21 and the power fluid pressure generation device 30. Thereby, in the brake device for the vehicle according to the present embodiment, the brake fluid pressure generated by the master cylinder 21 or the power fluid pressure generation device 30 or the brake fluid pressurizing section 55 according to a travelling state of the vehicle and/or an operation state of the brake device can be supplied to the wheel cylinders 42.

As illustrated in FIG. 1, the brake fluid pressure control valve device 50 as a fluid pressure control valve mechanism has the brake fluid pressurizing section 55 and FR, FL, RR and RL brake fluid pressure adjust sections 51, 52, 53 and 54 which can adjust the brake fluid pressure supplied to the respective wheel cylinders 42FR, 42FL, 42RR and 42RL of the brake units 40FR, 40FL, 40RR ad 40RL, respectively. In this regard, the brake fluid pressure control device 50 itself does not relate directly to the present invention. As described later, there can be employed any device (or unit) which has a pressurizing device (e.g., pump) for suctioning and pressurizing the brake fluid supplied from the reservoir 22 of the master cylinder unit 20 at least through bypass pipes 13 and 14 and can adjust the brake fluid pressure supplied to the wheel cylinders 42FR, 42FL, 42RR and 42RL of the brake units 40FR, 40FL, 40RR and 40RL by the pressurized brake fluid.

Note that as illustrated in FIG. 1, in the brake fluid pressure control valve device 50 according to the present embodiment, upstream sides of the FR and FL brake fluid pressure adjust sections 51 and 52 for adjusting the brake fluid pressure supplied to the wheel cylinders 42FR and 42FL for the right and left front vehicle wheels, respectively are connected to the master pressure pipe 11. Further, in the brake fluid pressure control valve device 50 according to the present embodiment, upstream sides of the RR and RL brake fluid pressure adjust sections 53 and 54 for adjusting the brake fluid pressure supplied to the wheel cylinders 42RR and 42RL for the right and left rear vehicle wheels, respectively are connected to the master pressure pipe 12. In other words, according to the present embodiment, the master pressure pipe 11 as a connection passage is provided corresponding to a brake system for supplying the brake fluid to the wheel cylinders 42FR and 42FL for the right and left front vehicle wheels, respectively and the master pressure pipe 12 as a connection passage is provided corresponding to a brake system for supplying the brake fluid to the wheel cylinders 42RR and 42RL for the right and left rear vehicle wheels, respectively.

The FR brake fluid pressure adjust section 51 is comprised of a booster valve PUfr which is a 2-ports-2-positions switching type normally-open electromagnetic open-and-close valve and a decompression valve PDfr which is a 2-ports-2-positions switching type normally-closed electromagnetic open-and-close valve. When an operation position of the booster valve PUfr corresponds to a first position (i.e., a switching position when the solenoid is not energized) illustrated in FIG. 1, the booster valve PUfr causes the upstream side of the FR brake fluid pressure adjust section 51 to be in communication with the wheel cylinder 42FR. When an operation position of the booster valve PUfr corresponds to a second position (i.e., a switching position when the solenoid is energized), the booster valve PUfr shuts off a communication of the upstream side of the FR brake fluid pressure adjust section 51 with the wheel cylinder 42FR. When an operation position of the decompression valve PDfr corresponds to a first position (i.e., a switching position when the solenoid is not energized) illustrated in FIG. 1, the decompression valve PDfr shuts off a communication of a reservoir RS1 provided in the brake fluid pressure control valve device 50 with the wheel cylinder 42FR. When the operation position of the decompression valve PDfr corresponds to a second position (i.e., a switching position when the solenoid is energized), the decompression valve PDfr causes the reservoir RS1 to be in communication with the wheel cylinder 42FR.

Thus, when the operation positions of the booster and decompression valves PUfr and PDfr correspond to the first positions illustrated in FIG. 1, respectively, the brake fluid (i.e. the brake fluid pressure) at the upstream side of the FR brake fluid pressure adjust section 51 is supplied to the wheel cylinder 42FR to increase the brake fluid pressure in the wheel cylinder 42FR. Further, when the operation position of the booster valve PUfr corresponds to the second position and the operation position of the decompression valve PDfr corresponds to the first position, the brake fluid pressure in the wheel cylinder 42FR is held regardless of whether the brake fluid pressure at the upstream side of the FR brake fluid pressure adjust section 51 is increased or decreased. Furthermore, when the operation positions of the booster and decompression valves PUfr and PDfr correspond to the second positions, respectively, the brake fluid in the wheel cylinder 42FR is recirculated to the reservoir RS1 to decrease the brake fluid pressure in the wheel cylinder 42FR.

Note that as illustrated in FIG. 1, the booster valve PUfr is provided with a check valve CV1. The check valve CV1 is configured to permit the brake fluid to flow only in a direction from the side of the wheel cylinder 42FR to the upstream side of the FR brake fluid pressure adjust section 51. Thereby, the brake fluid pressure in the wheel cylinder 42FR can be quickly decreased according to the decreasing of the brake fluid pressure upstream of the FR brake fluid pressure adjust section 51.

Similarly, the FL brake fluid pressure adjust section 52 has booster and decompression valves PUfl and PDfl. The RR brake fluid pressure adjust section 53 has booster and decompression valves PUrr and PDrr. The RL brake fluid pressure adjust section 54 has booster and decompression valves PUrl and PDrl. Thus, when the operation positions of the booster and decompression valves are controlled similar to the operation positions of the booster and decompression valves PUfr and PDfr, each of the brake fluid pressures in the wheel cylinders 42FL, 42RL and 42RR is increased or held or decreased. Note that the booster valves PUfl, PUrr and PUrl are provided with check valves CV2, CV3 and CV4 each having the same function as the function of the check valve CV1 in parallel to the booster valves, respectively.

As illustrated in FIG. 1, the brake fluid pressurizing section 55 has a motor MT and two pumps 55a and 55b simultaneously driven by the motor MT. As illustrated in FIG. 1, the pump 55a is configured to suction the brake fluid through the reservoir RS1 which can be in communication with the master pressure pipe 11, the brake fluid flowing from the reservoir 22 of the master cylinder unit 20 to the reservoir RS1 through the master pressure pipe 11 and the pressurizing chamber 21a1 of the master cylinder 21 and/or through the bypass pipe 13 and the atmospheric pressure chamber 21a2 of the master cylinder 21. In addition, the pump 55a is configured to supply the suctioned and pressurized brake fluid (i.e., brake fluid pressure) to the upstream sides of the FR and FL brake fluid pressure adjust sections 51 and 52 through check valves CV5 and CV6, respectively.

Similarly, as illustrated in FIG. 1, the pump 55b is configured to suction the brake fluid through a reservoir RS2 which can be in communication with the master pressure pipe 12, the brake fluid flowing from the reservoir 22 to the reservoir RS2 through the master pressure pipe 12 and the pressurizing chamber 21b1 of the master cylinder 21 and/or through the bypass pipe 14 and the atmospheric pressure chamber 21b2 of the master cylinder 21. In addition, the pump 55b is configured to supply the suctioned and pressurized brake fluid (i.e., brake fluid pressure) to the upstream sides of the RR and RL brake fluid pressure adjust sections 53 and 54 through check valves CV7 and CV8, respectively.

In this regard, as illustrated in FIG. 1, the upstream sides of the FR and FL brake fluid pressure adjust sections 51 and 52 are connected to the master pressure pipe 11 through a check valve CV9. Thereby, the pressurized brake fluid (i.e., brake fluid pressure) supplied from the master cylinder 21 of the master cylinder unit 20 or from the accumulator 32 of the brake fluid pressure generation device 30 is supplied to the upstream sides of the FR and FL brake fluid pressure adjust sections 51 and 52 through the master pressure pipe 11 and the check valve CV9. Further, as illustrated in FIG. 1, the upstream sides of the RR and RL brake fluid pressure adjust sections 53 and 54 are connected to the master pressure pipe 12 through a check valve CV10. Thereby, the pressurized brake fluid (i.e., brake fluid pressure) supplied from the master cylinder 21 or from the accumulator 32 is supplied to the upstream sides of the RR and RL brake fluid pressure adjust sections 53 and 54 through the master pressure pipe 12 and the check valve CV10.

According to the brake fluid pressure control valve device 50 configured as described above, it is possible to independently increase or decrease, by a predetermined amount, or hold the brake fluid pressure supplied to each of the wheel cylinders 42FR, 42FL, 42RR and 42RL from at least one of the master cylinder 21 of the master cylinder unit 20, the pressurizing pump 31 (in particular, the accumulator 32) of the brake fluid pressure generation device 30 and the pumps 55a and 55b by changing the switching position of each of the electromagnetic valves, respectively. Thereby, as described later, when the driver operates the brake pedal 10 to stop the vehicle during the vehicle travelling, for example, the pressurized brake fluid supplied from the pressurizing pump 31 (in particular, the accumulator 32) of the brake fluid pressure generation device 30 is supplied to each of the wheel cylinders 42FR, 42FL, 42RR and 42RL to increase the brake fluid pressure, thereby to apply a braking force to each of the vehicle wheels. Further, even when the driver does not operate the brake pedal 10, for example, in order to stabilize a behavior of the vehicle, the pressurized brake fluid supplied from the pumps 55a and 55b is supplied to each of the wheel cylinders 42FR, 42FL, 42RR and 42RL to increase the brake fluid pressure, thereby to apply a braking force to each of the vehicle wheels.

Drives of the master cylinder unit 20, the brake fluid pressure generation device 30 and the brake fluid pressure control valve device 50 are controlled by the brake ECU 60 as control means. The brake ECU 60 is comprised of a micro computer as a main component part including a CPU, a ROM, a RAM and the like and includes various drive circuits each for driving various electromagnetic open-and-close valves, various motors and the like of the master cylinder unit 20, the brake fluid pressure generation device 30 and the brake fluid pressure control valve device 50, an interface for receiving sensor signals from an accumulator pressure sensor 61, wheel cylinder pressure sensors 62 and 63, and a master cylinder pressure sensor 64, a communication interface and the like.

The accumulator pressure sensor 61 is provided downstream of the accumulator 32 and serves to detect an accumulator pressure Pacc to output a signal indicating the detected accumulator pressure Pacc to the brake ECU 60. Thereby, the brake ECU 60 reads the accumulator pressure Pacc with a predetermined time period. When the accumulator pressure Pacc is lower than a preset lowest set pressure, the brake ECU 60 drives the motor 33 to cause the pressurizing pump 31 to pressurize the brake fluid, thereby to control the accumulator pressure Pacc such that the accumulator pressure Pacc is always maintained at within a set pressure range.

The wheel cylinder pressure sensor 62 is provided upstream of the wheel cylinders 42FR and 42FL (for example, at the accumulator pressure pipe 15) and serves to detect a wheel cylinder pressure Pwc_F (corresponding to a control pressure of the wheel cylinders 42FR and 42FL) to output a signal indicating the detected wheel cylinder pressure Pwc_F to the brake ECU 60. The wheel cylinder pressure sensor 63 is provided upstream of the wheel cylinders 42RR and 42RL (for example, at the accumulator pressure pipe 16) and serves to detect a wheel cylinder pressure Pwc_R (corresponding to a control pressure of the wheel cylinders 42RR and 42RL) to output a signal indicating the detected wheel cylinder pressure Pwc_R to the brake ECU 60. The master cylinder pressure sensor 64 is provided downstream of the master cylinders 21 (for example, at the stroke simulator 28) and serves to detect a master cylinder pressure Pmc to output a signal indicating the detected master cylinder pressure Pmc to the brake ECU 60.

Further, a stroke sensor 65 provided on the brake pedal 10 and a vehicle behavior detection sensor 66 mounted on the vehicle are connected to the brake ECU 60. The stroke sensor 65 outputs, to the brake ECU 60, a signal indicating a pedal stroke Sm which corresponds to a brake operation amount (or a brake depression amount) of the brake pedal 10 by the driver. The vehicle behavior detection sensor 66 includes, for example, a yaw rate sensor for detecting a yaw rate generated in the vehicle, a lateral acceleration sensor for detecting a lateral acceleration, a longitudinal acceleration sensor for detecting a longitudinal acceleration and the like and outputs, to the brake ECU 60, a signal indicating physical amounts, i.e., behavior state amounts of the vehicle detected by these sensors, respectively. Further, vehicle wheel speed sensors 67 are connected to the brake ECU 60. Each of the vehicle wheel speed sensors 67 detects a vehicle wheel speed Vx which corresponds to a rotation speed of each of the right and left front and rear vehicle wheels to output a signal indicating the detected vehicle wheel speed Vx to the brake ECU 60.

Next, a brake control executed by the brake ECU 60 will be described. The brake ECU 60 executes a brake control by executing one of a normal control mode for adjusting the brake fluid pressure output from the brake fluid pressure generation device 30 depending on the brake operation of the brake pedal 10 carried out by the driver to transmit the adjusted brake fluid pressure to each of the wheel cylinders 42 and a behavior control mode for operating the brake fluid pressure control valve device 50 regardless of whether the brake pedal 10 is operated by the driver to automatically control the brake fluid pressure in each of the wheel cylinders 42.

Figure 2:
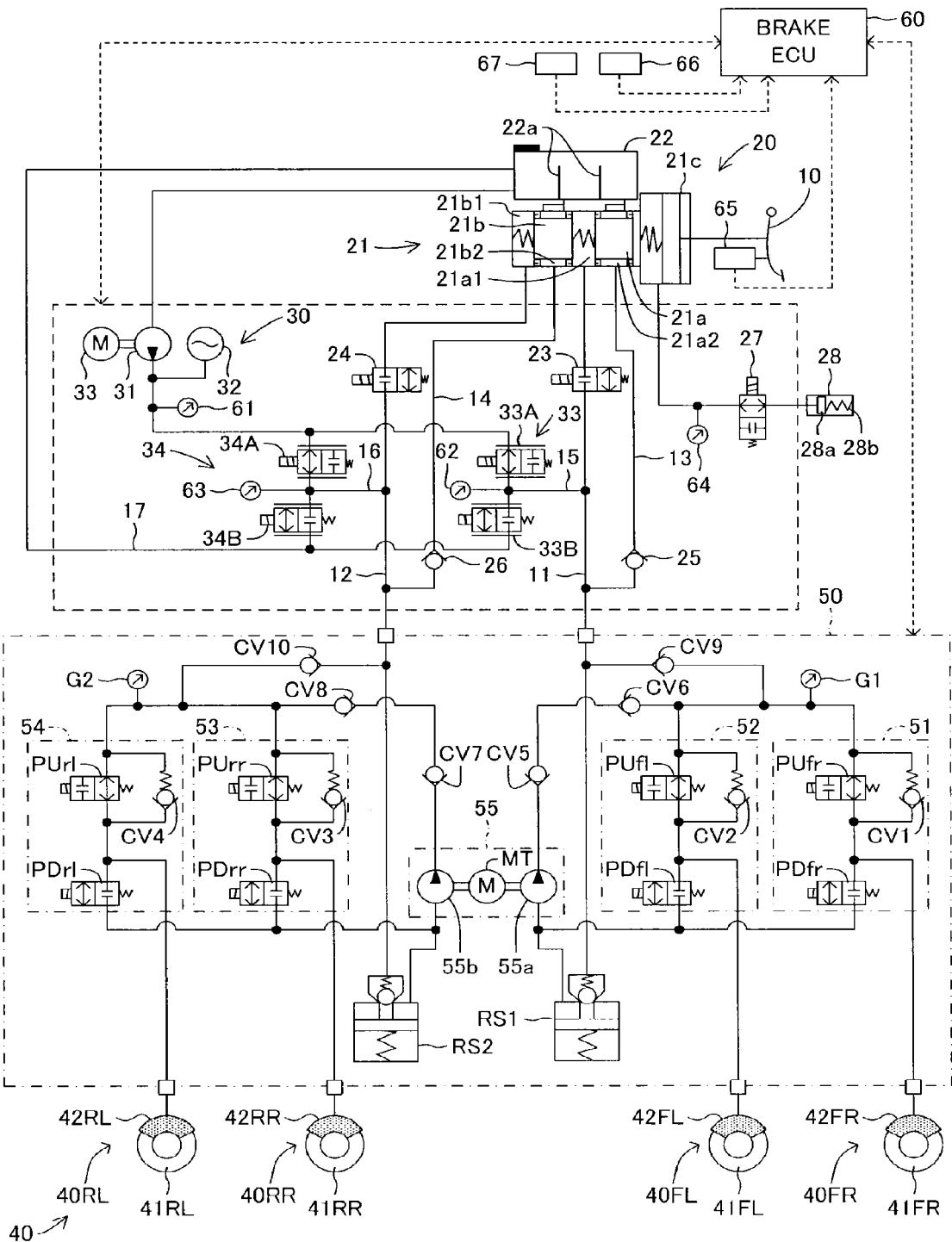
FIG. 2 illustrates a view for describing a normal mode for supplying, to wheel cylinders, a brake fluid pressurized by a brake fluid pressure generation device to brake the vehicle.

As illustrated in FIG. 2, in the normal control mode, when the brake pedal 10 is operated by the driver, the brake ECU 60 energizes each of the solenoids of the master cut valves 23 and 24 as normally-open electromagnetic open-and-close valves, respectively of the master cylinder unit 20 to change each of states of the master cut valves 23 and 24 to a closed state and energizes the solenoid of the simulator cut valve 27 as a normally-closed electromagnetic open-and-close valve to change a state of the simulator cut valve 27 to an open state. Then, in the normal control mode, the brake ECU 60 controls an electric power amount (or a current value) applied to each of the solenoids of the booster linear control valves 33A and 34A and the decompression linear control valves 33B and 34B of the brake fluid pressure generation device 30 to control each of opening degrees of the valves 33A, 34A, 33B and 34B to an opening degree depending on the energizing amount.

On the other hand, the brake ECU 60 maintains, at the first position, each of the operation positions of the booster and decompression valves PUfr and PDfr of the FR brake fluid pressure adjust section 51 constituting the brake fluid pressure control valve device 50, the booster and decompression valves PUfl and PDfl of the FL brake fluid pressure adjust section 52 constituting the brake fluid pressure control valve device 50, the booster and decompression valves PUrr and PDrr of the RR brake fluid pressure adjust section 53 constituting the brake fluid pressure control valve device 50 and the booster and decompression valves PUrl and PDrl of the RL brake fluid pressure adjust section 54 constituting the brake fluid pressure control valve device 50. In this regard, in the normal control mode according to the present embodiment, basically, the brake fluid pressurizing section 55 is not driven. Although detailed descriptions will be omitted, in the normal control mode, for example, when it is necessary to execute a well-known anti-lock brake control or the like on the basis of the vehicle wheel speeds Vx detected by the vehicle wheel sensors 66, respectively, the brake ECU 60 changes each of operation positions of the booster and decompression valves PUfr and PDfr, the booster and decompression valves PUfl and PDfl, the booster and decompression valves PUrr and PDrr and the booster and decompression valves PUrl and PDrl to the first or second position independently.

In this manner, in the normal control mode, each of the states of the master cult valves 23 and 24 is maintained at a closed state by controlling each of the switching positions of the valves constituting the master cylinder unit 20, the brake fluid pressure generation device 30 and the brake fluid pressure control valve device 50 and thus, the brake fluid pressure, i.e., the master cylinder pressure Pmc output from the master cylinder 21 is not transmitted to the wheel cylinders 42FR, 42FL, 42RR and 42RL through the brake fluid pressure control valve device 50. In other words, in this normal control mode, the solenoids of the booster linear control valves 33A and 34A and the decompression linear control valves 33B and 34B of the brake fluid pressure generation device 30 are energized and thus, the accumulator pressure Pacc output from the accumulator 32 depending on the master cylinder pressure Pmc reflecting the brake operation carried out by the driver is adjusted by the booster linear control valves 33A and 34A and the decompression linear control valves 33B and 34B and the adjusted accumulator pressure Pacc is supplied to each of the upstream sides of the FR, FL, RR and RL brake fluid pressure adjust sections 51, 52, 53 and 54 of the brake fluid pressure control valve device 50.

In this case, each of the operation positions of the booster and decompression valves PUfr and PDfr of the FR brake fluid pressure adjust section 51, the booster and decompression valves PUfl and PDfl of the FL brake fluid pressure adjust section 52, the booster and decompression valves PUrr and PDrr of the RR brake fluid pressure adjust section 53 and the booster and decompression valves PUrl and PDrl of the RL brake fluid pressure adjust section 54 of the brake fluid pressure control valve device 50 is maintained at the first position as described above and thus, the brake fluid pressure adjusted by the brake fluid pressure generation device 30 is transmitted to the wheel cylinders 42 provided corresponding to four vehicle wheels, respectively. In this case, at least, the wheel cylinder pressures Pwc_F of the wheel cylinders 42FR and 42FL provided corresponding to the right and left front vehicle wheels, respectively are the same as each other and the wheel cylinder pressures Pwc_R of the wheel cylinders 42RR and 42RL provided corresponding to the right and left rear vehicle wheels, respectively are the same as each other. Note that the wheel cylinder pressure Pwc_F is detected by the wheel cylinder pressure sensor 62 or a pressure sensor G1 provided in the brake fluid pressure control valve device 50 as illustrated in FIGS. 1 and 2 and the wheel cylinder pressure Pwc_R is detected by the wheel cylinder pressure sensor 63 or a pressure sensor G2 provided in the brake fluid pressure control valve device 50 as illustrated in FIGS. 1 and 2

For example, the vehicle provided with the brake device according to the present embodiment may be an electric vehicle (i.e., an EV) provided with a motor for driving the vehicle driven by a battery electric power source or a hybrid vehicle (i.e., a HV) provided with a motor for driving the vehicle and an internal combustion engine or a plug-in type hybrid vehicle (i.e., a PHV) including elements of the hybrid vehicle (i.e, the HV) and a battery charged using an outside electric power source. In such a vehicle, the motor for driving the vehicle converts a rotation energy of the vehicle wheels to an electric energy to generate an electric power and a regenerative braking for regenerating the generated electric power to the battery to generate braking forces can be carried out. When such a regenerative braking is carried out, a brake regenerative cooperative control using a regenerative braking and a fluid pressure braking concurrently can be carried out by generating, in the brake device, a braking force corresponding to a value obtained by subtracting a regenerative braking force from a total braking force necessary for braking the vehicle.

In particular, when the brake ECU 60 receives a braking request, the brake ECU 60 starts the brake regenerative cooperative control. The braking request is generated, for example, when the driver operates the brake pedal 10 or when the brake device should be automatically operated (i.e., when a so-called automatic brake should be operated) on the basis of a request from the other electronic control unit mounted on the vehicle. In this regard, according to the present embodiment, for example, a case that the automatic brake should be operated may include a case that a condition for starting an inter-vehicle distance control or a collision avoidance control or the like is satisfied.

When the brake ECU 60 receives the braking request, the brake ECU 60 acquires, as a brake operation amount, at least one of the master cylinder pressure Pmc detected by the master cylinder pressure sensor 64 and the stroke Sm detected by the stroke sensor 65. Then, the brake ECU 60 calculates a target braking force which increases as at least one of the acquired master cylinder pressure Pmc and/or the acquired stroke Sm increases. Regarding the acquisition of the brake operation amount, for example, a depression force sensor for directly detecting a pedal depression force to the brake pedal 10 exerted by the driver in place of the master cylinder pressure Pmc and/or the stroke Sm may be provided and the target braking force may be calculated on the basis of the detected pedal depression force.

The brake ECU 60 sends information on the calculated target braking force to a hybrid ECU (not illustrated) communicatively connected to the brake ECU 60. The hybrid ECU calculates a regenerative braking force out of the target braking force to be generated by the electric power regeneration carried out by the motor for driving the vehicle and sends information on the calculated regenerative braking force to the brake ECU 60. Thereby, the brake ECU 60 subtracts the regenerative braking force from the target braking force to calculate a target fluid pressure braking force which corresponds to a braking force to be generated by the brake device. In this regard, the regenerative braking force generated by the electric power regeneration carried out by the hybrid ECU changes depending on the change of the rotation speed of the motor for driving the vehicle and depending on the regenerative electric power control depending on a charge state (in particular, SOC: State Of Charge) of the battery not illustrated. Therefore, an appropriate target fluid pressure braking force can be calculated by subtracting the regenerative braking force from the target braking force.

Then, the brake ECU 60 calculates a target fluid pressure of each of the wheel cylinders 42 depending on the target fluid pressure braking force on the basis of the calculated target fluid pressure braking force and controls a drive-electric-current supplied to each of the booster linear control valves 33A and 34A and the decompression linear control valves 33B and 34B by a feedback control such that each of the wheel cylinder pressures Pwc_F and Pwc_R becomes equal to the target fluid pressure. In other words, the brake ECU 60 controls each of electric power amounts (or current values) applied to the solenoids of the booster linear control valves 33A and 34A and the decompression linear control valves 33B and 34B such that the wheel cylinder pressure Pwc_F (i.e., control pressure) detected by the wheel cylinder pressure sensor 62 (or the pressure sensor G1) and the wheel cylinder pressure Pwc_R (i.e., control pressure) detected by the wheel cylinder pressure 63 (or the pressure sensor G2) follow the target fluid pressure, respectively.

Thereby, the brake fluid having an adjusted pressure is supplied from the brake fluid pressure generation device 30 to the upstream sides of the FR, FL, RR and RL brake fluid pressure adjust sections 51, 52, 53 and 54 of the brake fluid pressure control valve device 50, respectively to increase the wheel cylinder pressure Pwc_F of the wheel cylinders 42FR and 42FL and the wheel cylinder pressure Pwc_R of the wheel cylinder 42RR and 42RL, thereby to generate braking forces in the vehicle wheels. Note that in this case, the wheel cylinder pressures Pwc_F and Pwc_R can be precisely adjusted by independently opening or closing the booster valves PUfr, PUfl, PUrr and PUrl and the decompression valves PDfr, PDfl, PDrr and PDrl of the FR, FL, RR and RL brake fluid pressure adjust sections 51, 52, 53 and 54 to control the flow of the brake fluid to the wheel cylinders 42.

In particular, for example, in case that regenerative braking forces are generated in the right and left rear vehicle wheels, respectively, the brake ECU 60 first generates a fluid pressure braking force corresponding to the regenerative braking force in each of the right and left front vehicle wheels. In other words, in this case, the FR and FL brake fluid pressure adjust sections 51 and 52 supply the adjusted brake fluid from the brake fluid pressure generation device 30 to the wheel cylinders 42FR and 42FL, respectively to first increase the wheel cylinder pressure Pwc_F, thereby to generate fluid pressure braking forces. Then, as described above, the brake ECU 60 controls operations of the FR, FL, RR and RL brake fluid pressure adjust sections 51, 52, 53 and 54 supplied with the adjusted brake fluid from the brake fluid pressure generation device 30 such that the wheel cylinder pressures of the wheel cylinders 42 become equal to target fluid pressures corresponding to the calculated target fluid pressure braking forces, respectively.

In this regard, as described above, the bypass pipes 13 and 14 are connected to the master pressure pipes 11 and 12 through the check valves 25 and 26, respectively. In this manner, since the check valves 25 and 16 is provided in the bypass pipes 13 and 14, respectively, the flow of the brake fluid toward the master cylinder 21 from the upstream sides of the FR, FL, RR and FL brake fluid pressure adjust sections 51, 52, 53 and 54 through the bypass pipes 13 and 14 is prohibited and thus, the brake fluid pressure can be transmitted appropriately to the wheel cylinders 42.

For example, when the brake operation carried out by the driver is released and thus, the target braking force becomes zero, the brake ECU 60 stops energizing the solenoids of all of the electromagnetic valves constituting the master cylinder unit 20 and the brake fluid pressure generation device 30 to return the operation positions of all of the electromagnetic valves to original positions illustrated in FIG. 1, respectively. On the other hand, when the target braking force becomes zero, the brake ECU 60, for example, maintains each of the operation positions of the booster valves PUfr, PUfl, PUrr and PUrl and the decompression valves PDfr, PDfl, PDrr and PDrl of the FR, FL, RR and RL brake fluid pressure adjust sections 51, 52, 53 and 54 of the brake fluid pressure control valve device 50 at the first position. Thereby, the brake fluid in the wheel cylinders 42 flows to the reservoir 22 through the master pressure pipes 11 and 12 and the pressurizing chambers 21a1 and 21b1 of the master cylinder 21 and thus, the brake fluid pressures in the wheel cylinders 42 are decreased. Note that in this case, the brake ECU 60 may change each of the operation positions of the booster valves PUfr, PUfl, PUrr and PUrl and the decompression valves PDfr, PDfl, PDrr and PDrl of the brake fluid pressure control valve device 50 to the second position to recirculate the brake fluid in the wheel cylinders 42 to the reservoirs RS1 and RS2, thereby to quickly decrease the brake fluid pressures in the wheel cylinders 42.

Note that it is obvious that the brake regenerative cooperative control is not essential in the present invention and the present invention can be applied to a vehicle in which regenerative braking forces are not generated. In this case, the target fluid pressure may be directly calculated on the basis of the brake operation amount and the calculated target fluid pressure may be set, for example, to a value which increases as the brake operation amount increases by using a map or a calculation expression or the like.

Next, there will be described a behavior control mode for operating the brake fluid pressure control valve device 50 regardless of whether the driver operates the brake pedal, for example, in accordance with a traction control (i.e., a TRC) or a vehicle stability control (i.e., a VSC) or the like to stabilize the behavior of the vehicle. Note that in the following description, for facilitating an understanding, a case that the vehicle stability control is executed as the behavior control mode will be exemplified.

In general, when a difference in a longitudinal force between the right and left vehicle wheels is generated during the vehicle travelling, a yaw moment can be generated in the vehicle. Such a difference in the longitudinal force between the right and left vehicle wheels can be generated by applying a braking force to one of the right and left vehicle wheels. Note that in case that the vehicle is the EV or the HV or the PHV and a motor for driving the vehicle is provided on each of the vehicle wheels, a driving force can be applied to the other vehicle wheel. In this case, when the vehicle is turning, the application of the barking force to the vehicle wheel located inward in terms of the vehicle turning causes a direction of the yaw moment generated in the vehicle to match a vehicle turning direction, thereby to stabilize the behavior of the vehicle during the vehicle turning.

In view of this, the brake ECU 60 automatically generates a difference in the longitudinal force between the right and left vehicle wheels, that is, applies a braking force to one of the vehicle wheels depending on a behavior state amount of the vehicle acquired from the vehicle behavior detection sensor 66, in particular, at least one of magnitudes of the yaw rate and the lateral acceleration generated in the vehicle to stabilize the behavior of the vehicle when at least one of the magnitudes of the yaw rate and the lateral acceleration exceeds a preset predetermined value and thus, the behavior of the vehicle tends to become unstable. In particular, when the vehicle travels turning rightward, the brake ECU 60 generates a braking force at each of the right front and rear vehicle wheels located inward in terms of the vehicle turning and on the other hand, when the vehicle travels turning leftward, the brake ECU 60 generates a braking force at each of the left front and rear vehicle wheels located inward in terms of the vehicle turning. In this behavior control mode, the brake ECU 60 supplies the brake fluid pressurized by the brake fluid pressurizing section 55 of the brake fluid pressure control valve device 50 to at least one of the wheel cylinders 42FL and 42RL or at least one of the wheel cylinders 42FR and 42RR.

Note that in the following description, for simplifying the description, there will be described a case that braking forces are applied to the right front and rear vehicle wheels, respectively when the vehicle is turning rightward and the driver does not operate the brake pedal 10, braking forces are applied to the left front and rear vehicle wheels, respectively when the vehicle is turning leftward and the driver does not operate the brake pedal 10 and each of the states of the master cut valves 23 and 24 is maintained at an open state.

Figure 3:
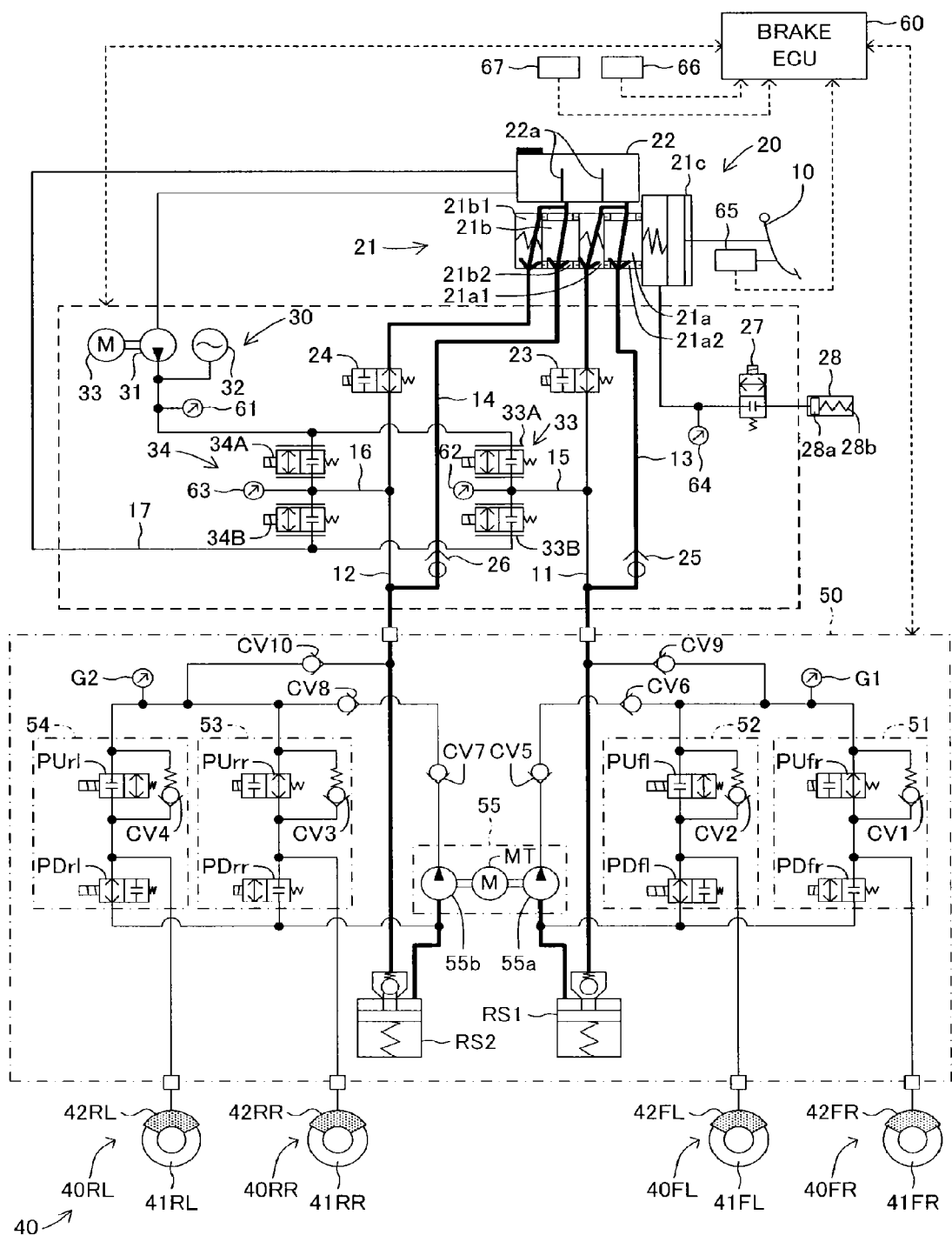
FIG. 3 illustrates a view for describing a behavior control mode according to the first embodiment of the present invention in which a brake fluid pressurizing section provided in the brake fluid pressure control valve device suctions the brake fluid from a reservoir of a master cylinder unit and pressurizes the suctioned brake fluid to supply the pressurized brake fluid to the wheel cylinders.

In particular, as illustrated in FIG. 3, when the vehicle is turning rightward, the brake ECU 60 maintains each of the operation positions of the booster valves PUfr and PUrr and the decompression valves PDfr and PDrr of the FR and RR brake fluid pressure adjust sections 51 and 53 of the brake fluid pressure control valve device 50 at the first position and maintains each of the operation positions of the booster valves PUfl and PUrl and the decompression valves PDfl and PDrl of the FL and RL brake fluid pressure adjust sections 52 and 54 of the brake fluid pressure control valve device 50 at the second position. On the other hand, although an illustration is omitted, when the vehicle is turning leftward, the brake ECU 60 maintains each of the operation positions of the booster valves PUfl and PUrl and the decompression valves PDfl and PDrl of the FL and RL brake fluid pressure adjust sections 52 and 54 of the brake fluid pressure control valve device 50 at the first position and maintains each of the operation positions of the booster valves PUfr and PUrr and the decompression valves PDfr and PDrr of the FR and RR brake fluid pressure adjust sections 51 and 53 of the brake fluid pressure control valve device 50 at the second position.

Further, the brake ECU 60 drives the motor MT of the brake fluid pressurizing section 55 to cause the pumps 55a and 55b to discharge the pressurized brake fluid. Below, the discharge of the brake fluid by the brake fluid pressurizing section 55 will be described in detail.

As illustrated in FIG. 3, when the brake pedal 10 is not operated by the driver (i.e., during the non-operation), the pump 55a suctions the brake fluid which flows through a route formed by the master pressure pipe 11 which is in communication with the reservoir 22 of the master cylinder unit 20 through the the pressurizing chamber 21a1 of the master cylinder 21, the master cut valve 23 and the reservoir RS1 (hereinafter, this route will be referred to as the master pipe route) and suctions the brake fluid which flows through a route formed by the master pressure pipe 11 which is in communication with the reservoir 22 through the the atmospheric pressure chamber 21a2 of the master cylinder 21, the bypass pipe 13 and the check valve 25 (hereinafter, this route will be referred to as the bypass pipe route). In this regards, in terms of the structure, a flow passage (i.e., an open-and-close valve part) of the master cut valve 23 from the master cylinder 21 side (i.e., from the upstream side) to the brake fluid pressure control valve device 50 side (i.e., from the downstream side) is narrow and thus, acts as a so-called orifice to generate a large resistance against the flowing of the brake fluid. On the other hand, in terms of the structure, the check valve 25 does not generate a large resistance against the flowing of the brake fluid from the master cylinder 21 side (i.e., from the upstream side) to the brake fluid pressure control valve device 50 side (i.e., from the downstream side).

Therefore, as illustrated by a thick line in FIG. 3, the pump 55a suctions the brake fluid from the reservoir 22 preferentially through the bypass pipe route having a flow resistance (or a pressure loss) smaller than a flow resistance (or a pressure loss) of the master pipe route to pressurize the suctioned brake fluid. Then, the pump 55a discharges the suctioned and pressurized brake fluid (i.e., brake fluid pressure) to supply the brake fluid to the upstream side of the FR brake fluid pressure adjust section 51 and the upstream side of the FL brake fluid pressure adjust section 52 through the check valves CV5 and CV6.

Similarly, when the brake pedal 10 is not operated by the driver, the pump 55b suctions the brake fluid through a master pipe route formed by the master pressure pipe 12 which is in communication with the reservoir 22 through the the pressurizing chamber 21b1 of the master cylinder 21, the master cut valve 24 and the reservoir RS2 and suctions the brake fluid through a bypass pipe route formed by the master pressure pipe 12 which is in communication with the reservoir 22 through the the atmospheric pressure chamber 21b2 of the master cylinder 21, the bypass pipe 14 and the check valve 26. In this regards, similar to the master cut valve 23, the master cut valve 24 acts as a so-called orifice to generate a large resistance against the flowing of the brake fluid.

On the other hand, similar to the check valve 25, the check valve 26 allows the brake fluid to flow therethrough from the master cylinder 21 side (i.e., from the upstream side) to the brake fluid pressure control valve device 50 side (i.e., from the downstream side) without any resistance. Therefore, as illustrated by a thick line in FIG. 3, the pump 55b also suctions the brake fluid from the reservoir 22 preferentially through the bypass pipe route having a flow resistance (or a pressure loss) smaller than a flow resistance (or a pressure loss) of the master pipe route to pressurize the suctioned brake fluid. Then, the pump 55b discharges the suctioned and pressurized brake fluid (i.e., brake fluid pressure) to supply the brake fluid to the upstream sides of the RR and RL brake fluid pressure adjust sections 53 and 54 through the check valves CV7 and CV8.

In this manner, the pressurized brake fluid (or the brake fluid pressure) is supplied from the brake fluid pressurizing section 55 and thus, when the vehicle is turning rightward, each of the operation positions of the booster and decompression valves PUfr and PDfr is maintained at the first position and thus, the FR brake fluid pressure adjust section 51 supplies the brake fluid (or the brake fluid pressure) from the pump 55a to increase the wheel cylinder pressure Pwc_F in the wheel cylinder 42FR, thereby to generate a braking force in the right front vehicle wheel which corresponds to the vehicle wheel located inward in terms of the vehicle turning. In addition, each of the operation positions of the booster and decompression valves PUrr and PDrr is maintained at the first position and thus, the RR brake fluid pressure adjust section 53 supplies the brake fluid (or the brake fluid pressure) from the pump 55b to increase the wheel cylinder pressure Pwc_R in the wheel cylinder 42RR, thereby to generate a braking force in the right rear vehicle wheel which corresponds to the vehicle wheel located inward in terms of the vehicle turning. On the other hand, each of the operation positions of the booster and decompression valves PUfl and PDfl is changed to the second position and thus, the FL brake fluid pressure adjust section 52 does not supply the brake fluid (or the brake fluid pressure) and decreases (or holds) the wheel cylinder pressure Pwc_F in the wheel cylinder 42FL without generating a braking force in the left front vehicle wheel which corresponds to the vehicle wheel located outward in terms of the vehicle turning. In addition, each of the operation positions of the booster and decompression valves PUrl and PDrl is changed to the second position and thus, the RL brake fluid pressure adjust section 54 does not supply the brake fluid (or the brake fluid pressure) and decreases (or maintains) the wheel cylinder pressure Pwc_R in the wheel cylinder 42RL without generating a braking force in the left rear vehicle wheel which corresponds to the vehicle wheel located outward in terms of the vehicle turning.

Similarly, when the vehicle is turning leftward, the pressurized brake fluid (or the brake fluid pressure) is supplied from the brake fluid pressurizing section 55 and thus, each of the operation positions of the booster and decompression valves PUfl and PDfl is maintained at the first position and thus, the FL brake fluid pressure adjust section 52 supplies the brake fluid (or the brake fluid pressure) from the pump 55a to increase the wheel cylinder pressure Pwc_F in the wheel cylinder 42FL, thereby to generate a braking force in the left front vehicle wheel which corresponds to the vehicle wheel located inward in terms of the vehicle turning. In addition, each of the operation positions of the booster and decompression valves PUrl and PDrl is maintained at the first position and thus, the RL brake fluid pressure adjust section 54 supplies the brake fluid (or the brake fluid pressure) from the pump 55b to increase the wheel cylinder pressure Pwc_R in the wheel cylinder 42RL, thereby to generate a braking force in the left rear vehicle wheel which corresponds to the vehicle wheel located inward in terms of the vehicle turning. On the other hand, each of the operation positions of the booster and decompression valves PUfr and PDfr is changed to the second position and thus, the FR brake fluid pressure adjust section 51 does not supply the brake fluid (or the brake fluid pressure) and decreases (or holds) the wheel cylinder pressure Pwc_F in the wheel cylinder 42FR without generating a braking force in the right front vehicle wheel which corresponds to the vehicle wheel located outward in terms of the vehicle turning. In addition, each of the operation positions of the booster and decompression valves PUrr and PDrr is changed to the second position and thus, the RR brake fluid pressure adjust section 53 does not supply the brake fluid (or the brake fluid pressure) and decreases (or maintains) the wheel cylinder pressure Pwc_R in the wheel cylinder 42RR without generating a braking force in the right rear vehicle wheel which corresponds to the vehicle wheel located outward in terms of the vehicle turning.

Note that when a braking force should be generated in the vehicle wheel located inward in terms of the vehicle turning, the brake fluid pressure in the wheel cylinder 42 for the vehicle wheel located inward in terms of the vehicle turning can be held or decreased, for example, by temporarily changing each of the operation positions of the booster and decompression valves to the second position to achieve a necessary braking force. Otherwise, the brake fluid pressure supplied from the pumps 55a and 55b of the brake fluid pressurizing section 55 can be adjusted by linear control valves not illustrated and supplied to the upstream sides of the brake fluid pressure adjust sections 51 to 54, respectively.

In this manner, in the behavior control mode, regardless of whether the driver operates the brake pedal, the pumps 55a and 55b of the brake fluid pressurizing section 55 can suction a sufficient amount of the brake fluid quickly from the reservoir 22 preferentially through the bypass pipe route and can pressurize the suctioned brake fluid to generate a braking force in the vehicle wheel located inward in terms of the vehicle turning by using the pressurized brake fluid (or the brake fluid pressure). Thereby, a yaw appropriate for the vehicle turning direction can be generated quickly and appropriately to stabilize the behavior of the vehicle which is turning.

As can be understood from the above descriptions, according to the first embodiment, the pumps 55a and 55b, which constitute the brake fluid pressurizing section 55 of the brake fluid pressure control valve device 50, can suction extremely smoothly a sufficient amount of the brake fluid reserved in the reservoir 22 provided in the master cylinder unit 20 preferentially through the bypass pipe route and can pressurize the suctioned brake fluid. Further, the master and bypass pipe routes are provided corresponding to a brake system for the right and left front wheels while the master and bypass pipe routes are provided corresponding to a brake system for the right and left rear wheels. Thus, the master and bypass pipe routes can become in communication independently with the fluid chambers defined by the partition wall 22a in the reservoir 22, respectively.

Thereby, even when a problem such as a fluid leakage occurs in one of the master and bypass pipe routes downstream of the check valve 25 or 26, one of the pumps 55a and 55b of the brake fluid pressurizing section 55 can suction the brake fluid through the bypass or master pipe route where a problem such as a fluid leakage does not occur (in particular, preferentially through the bypass pipe route) and can pressurize the suctioned brake fluid. Therefore, a necessary and sufficient redundancy can be provided and thus, even when the problem occurs, the pressurized brake fluid (or the brake fluid pressure) can be appropriately supplied to the wheel cylinders 42 to apply braking forces to the vehicle wheels, respectively.

b. Second Embodiment

According to the first embodiment, the bypass pipe routes are formed by the bypass pipes 13 and 14 and the check valves 25 and 26, which connect the bypass pipes 13 and 14 to the master pressure pipes 11 and 12, respectively. Thereby, according to the first embodiment, the reservoir 22 is in communication with the brake fluid pressurizing section 55 of the brake fluid pressure control valve device 50 through two atmospheric pressure chambers 21a2 and 21b2 formed in the master cylinder 21 of the master cylinder unit 20, the bypass pipes 13 and 14 and the check valves 25 and 26. Therefore, according to the first embodiment, the pumps 55a and 55b of the brake fluid pressurizing section 55 can suction the brake fluid from the reservoir 22 of the master cylinder unit 20 through the check valves 25 and 26 and can pressurize the suctioned brake fluid, thereby to supply the pressurized brake fluid (or the brake fluid pressure) to the upstream sides of the FR and FL brake fluid pressure adjust sections 51 and 52 and the upstream sides of the RR and RL brake fluid pressure adjust section 53 and 54, respectively.

According to the first embodiment, the brake fluid pressurizing section 55 is connected communicatively to the reservoir 22 of the master cylinder unit 20 through two (or two system) bypass pipe routes having the bypass pipes 13 and 14 connected to two atmospheric pressure chambers 21a2 and 21b2 of the master cylinder 21 and the check valves 25 and 26, respectively. Thereby, for example, even when an malfunction such as a leakage of the brake fluid occurs in one of the systems, the brake fluid can be suctioned through the other system and can be pressurized and thus, eventually, appropriate braking forces can be applied to the front and rear wheels, respectively. In other words, according to the first embodiment, two system bypass pipe routes are provided in communication with the reservoir 22 through two atmospheric pressure chambers 21a2 and 21b2 of the master cylinder 21 and thus, a necessary and sufficient redundancy can be ensured, thereby to apply braking forces to the vehicle wheels, respectively.

However, according to the first embodiment, it is necessary to provide two system bypass pipe routes which are in communication with the atmospheric pressure chambers 21a2 and 21b2 of the master cylinder 21 through the reservoir 22, respectively. Thus, for example, when a master cylinder conventionally mounted in a normal vehicle (hereinafter, this master cylinder will be referred to as the normal master cylinder), which does not constitute a regenerative actuator, is used (or diverted), it may be difficult to communicatively connect the bypass pipes 13 and 14 to this master cylinder (i.e., it may be difficult to provide two system bypass pipe routes). In particular, when the normal master cylinder is a tandem type similar to the master cylinder 21 according to the first embodiment, for example, it is relatively easy to provide an atmospheric pressure chamber formed by a proximal pressurizing piston of the master cylinder located at the brake pedal 10 side or it is relatively easy to provide a port which faces a back surface of the proximal pressurizing piston. However, it is necessary to provide an another port for connecting to an atmospheric pressure chamber formed at the distal end of the master cylinder and thus, it is not realistic since the cost is increased.

Accordingly, there will be described a second embodiment in which similar to the first embodiment, even when the normal master cylinder is used, the brake fluid pressurizing section 55 of the brake fluid pressure control valve device 50 can suction the brake fluid smoothly from the reservoir 22 of the master cylinder unit 20 and a necessary and sufficient redundancy can be ensured. Note that in the following description, the second embodiment will be described in detail and the detailed descriptions of the same elements as the elements according to the first embodiment will be omitted while the same elements as the elements according to the first embodiment are accompanied with the same reference symbols as the reference symbols indicating the elements according to the first embodiment.

Figure 4:
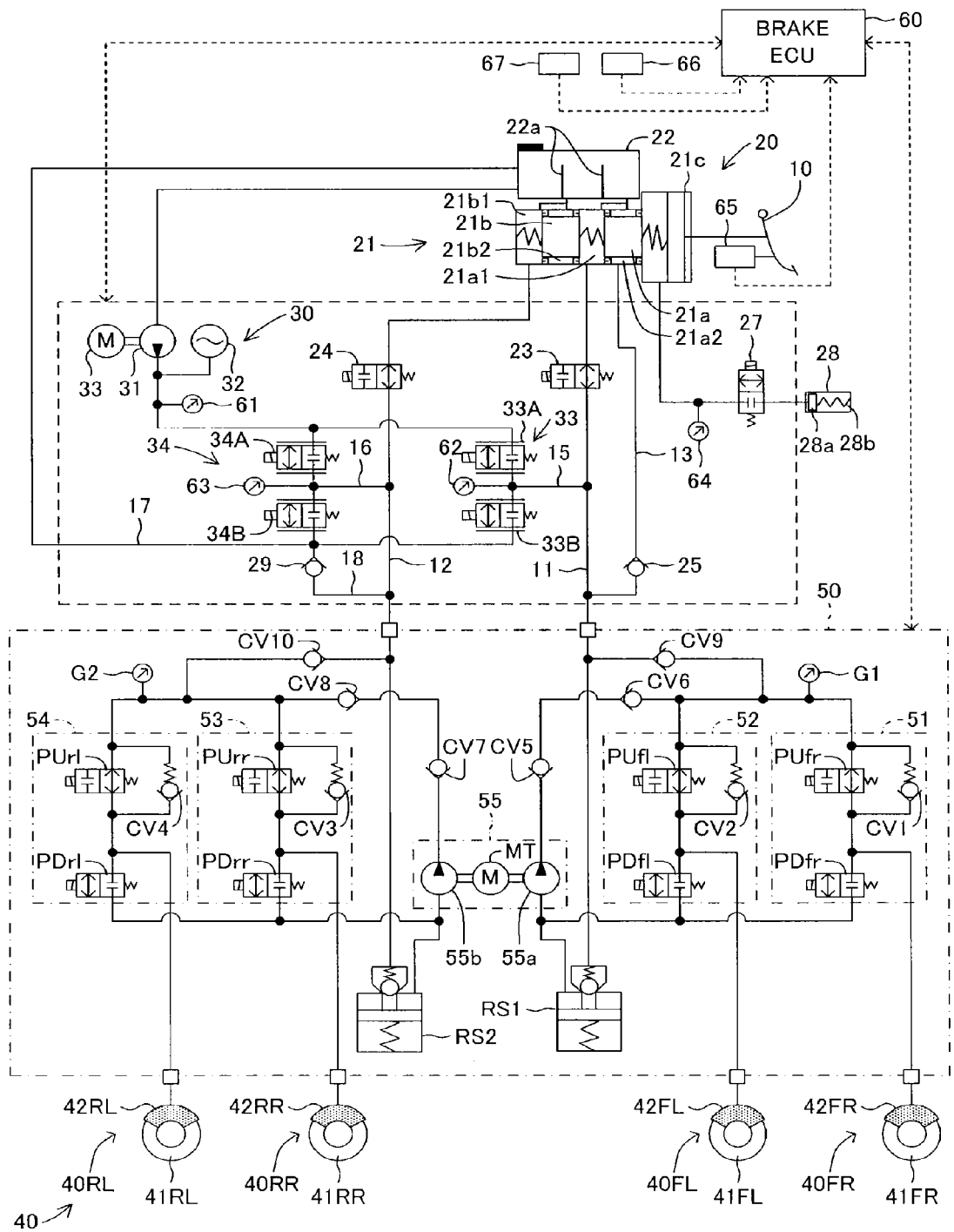
FIG. 4 illustrates a schematic system view of the brake device for the vehicle according to a second embodiment of the present invention.

According to the second embodiment, as illustrated in FIG. 4, only the bypass pipe 13 is connected to the proximate end of the master cylinder 21 of the master cylinder unit 20 and the bypass pipe 14 connected to the distal end of the master cylinder 21 according to the first embodiment will be omitted. Thereby, it is not necessary to provide another port for connecting the bypass pipe 14 to the proximate end and thus, the normal master cylinder can be easily employed (or diverted) as the master cylinder 21 without increasing the cost. Note that in this case, the stroke simulator 28 can be connected to the bypass pipe 13.

As illustrated in FIG. 4, according to the second embodiment, in place of the bypass pipe 14 according to the first embodiment, a bypass pipe 18 is provided for communicatively connecting the master pressure pipe 12 to the reservoir pipe 17 as the recirculation passage connected to the decompression linear control valves 33B and 34B of the brake fluid pressure generation device 30. According to the second embodiment, a check valve 29 is provided in the bypass pipe 18. As illustrated in FIG. 4, the check valve 29 permits only the flow of the brake fluid from the reservoir pipe 17, which is in communication with the reservoir 22, to the brake fluid pressure control valve device 50 through the master pressure pipe 18 and prohibits the flow of the brake fluid from the brake fluid pressure control valve device 50 to the reservoir pipe 17, that is, the reservoir 22.

Figure 5:
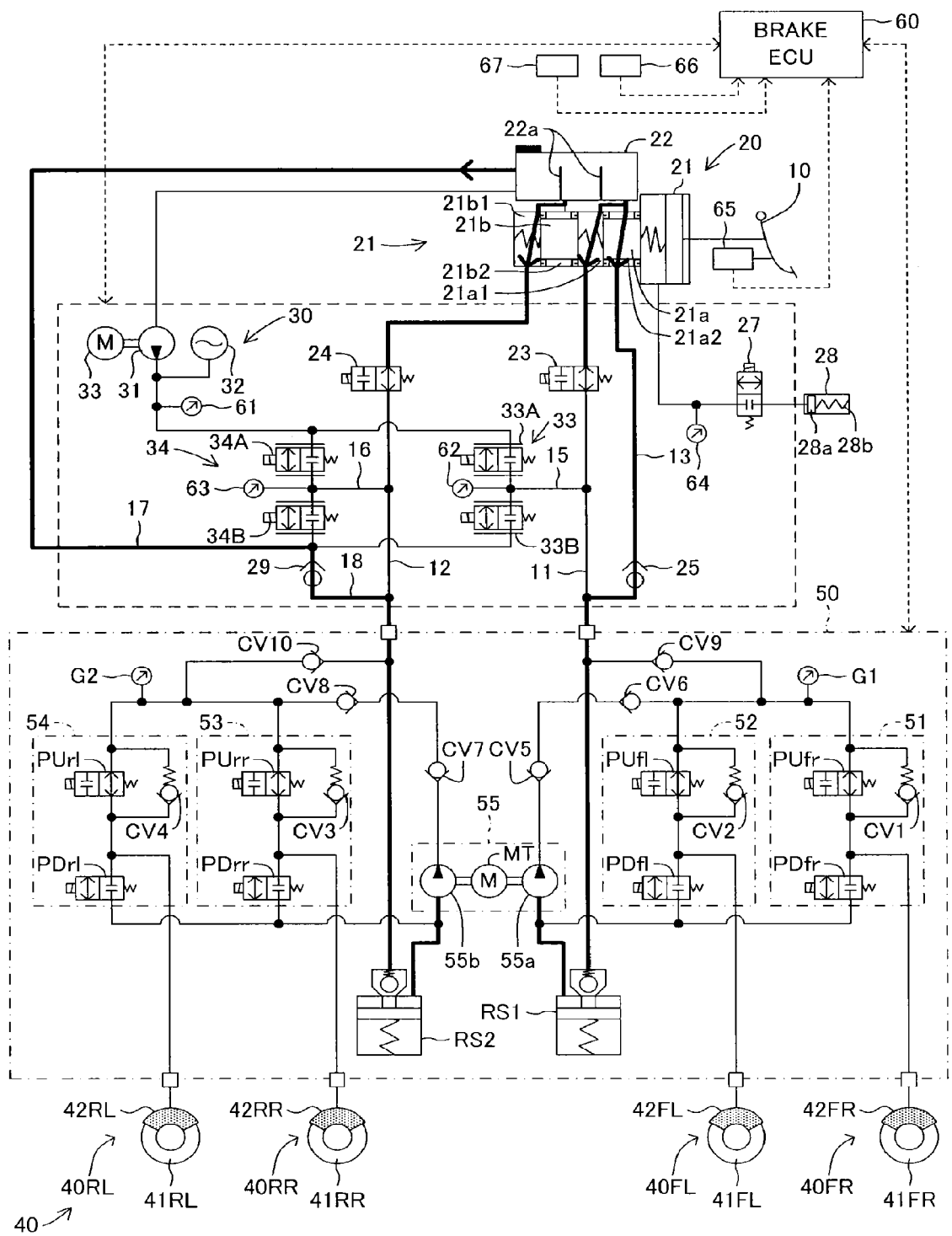
FIG. 5 illustrates a view for describing the behavior control mode according to the second embodiment of the present invention.

As illustrated in FIG. 5, in a behavior control mode according to the second embodiment configured as such, similar to the first embodiment, the pump 55a of the brake fluid pressurizing section 55 suctions the brake fluid flowing from the reservoir 22 of the master cylinder unit 20 through the master pipe route comprised of the master cut valve 23 and the master pressure pipe 11 and suctions the brake fluid flowing through the bypass pipe route comprised of the check valve 25 and the bypass pipe 13. Therefore, also according to the second embodiment, the pump 55a suctions the brake fluid from the reservoir 22 preferentially through the bypass pipe route having a flow resistance (or a pressure loss) smaller than a flow resistance (or a pressure loss) of the master pipe route and pressurizes the suctioned brake fluid. Then, the pump 55a discharges and supplies the suctioned and pressurized brake fluid (or the brake fluid pressure) to the upstream sides of the FR and FL brake fluid pressure adjust sections 51 and 52 through the check valves CV5 and CV6.

On the other hand, as illustrated in FIG. 5, similar to the first embodiment, the pump 55b of the brake fluid pressurizing section 55 suctions the brake fluid flowing from the reservoir 22 of the master cylinder unit 20 through the master pipe route comprised of the master cut valve 24 and the master pressure pipe 12 and suctions the brake fluid from the reservoir 22 through the bypass pipe route comprised of the reservoir pipe 17, the bypass pipe 18 and the master pressure pipe 12 connected through the check valve 29. In this regards, the check valve 29 allows the brake fluid to flow from the reservoir 22 (or from the reservoir pipe 17) to the brake fluid pressure control valve device 50 side thereof without a resistance.

Therefore, the pump 55b according to the second embodiment also suctions the brake fluid from the reservoir 22 preferentially through the bypass pipe route having a flow resistance (or a pressure loss) smaller than a flow resistance (or a pressure loss) of the master pipe route and pressurizes the suctioned brake fluid. Then, the pump 55b discharges and supplies the suctioned and pressurized brake fluid (or the brake fluid pressure) to the upstream sides of the RR and RL brake fluid pressure adjust sections 53 and 54 through the check valves CV7 and CV8.

In this manner, in this behavior control mode according to the second embodiment, regardless of whether the driver operates the brake pedal, the pump 55a of the brake fluid pressurizing section 55 can suction a sufficient amount of the brake fluid from the reservoir 22 through the bypass pipe route passing through the atmospheric pressure chamber 21a2 of the master cylinder 21 and pressurizes the suctioned brake fluid. The pump 55b of the brake fluid pressurizing section 55 can suction a sufficient amount of the brake fluid from the reservoir 22 through the bypass pipe route passing through the reservoir pipe 17 and pressurizes the suctioned brake fluid. Thereby, also according to the second embodiment, for example, braking forces can be generated in the vehicle wheels located inward in terms of the vehicle turning by using the brake fluid (or the brake fluid pressure) smoothly and appropriately pressurized and thus, a yaw appropriate for the vehicle turning direction can be generated, thereby to stabilize the behavior of the vehicle which is turning.

As can be understood from the above descriptions, also according to the second embodiment, the pumps 55a and 55b, which constitute the brake fluid pressurizing section 55 of the brake fluid pressure control valve device 50, can suction extremely smoothly a sufficient amount of the brake fluid, which is reserved in the reservoir 22 provided in the master cylinder unit 20, preferentially through the bypass pipe route and can pressurize the suctioned brake fluid. Further, for example, similar to the first embodiment, in case that the bypass pipe route configured to include the reservoir pipe 17 is combined, a redundancy can be surely ensured by causing the bypass pipe route to be in communication with the reservoir 22 through a different pipe (or a different passage), compared with a case that the entire bypass pipe route is configured to include the atmospheric pressure chambers 21a2 and 21b2 of the master cylinder 21. As a result, when the brake pedal 10 is not operated, the pumps 55a and 55b of the brake fluid pressurizing section 55 can suction surely the brake fluid through the bypass pipe route and can supply the pressurized brake fluid (or the brake fluid pressure) to the wheel cylinders 42 to apply braking forces to the vehicle wheels, respectively.

c. Modified Example

Figure 6:
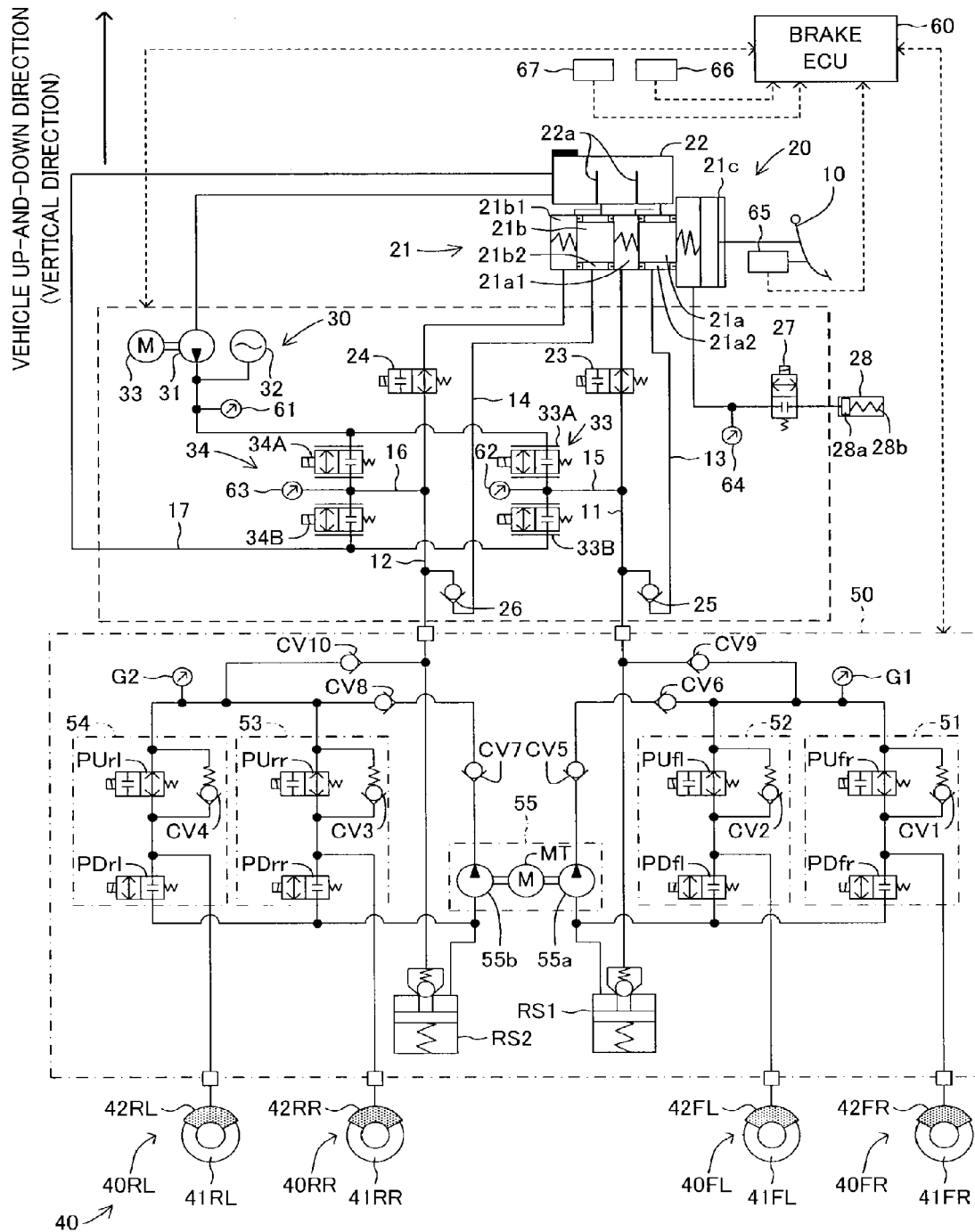
FIG. 6 illustrates a schematic system view of the brake device for the vehicle according to a modified example of the first embodiment of the present invention.
Figure 7:
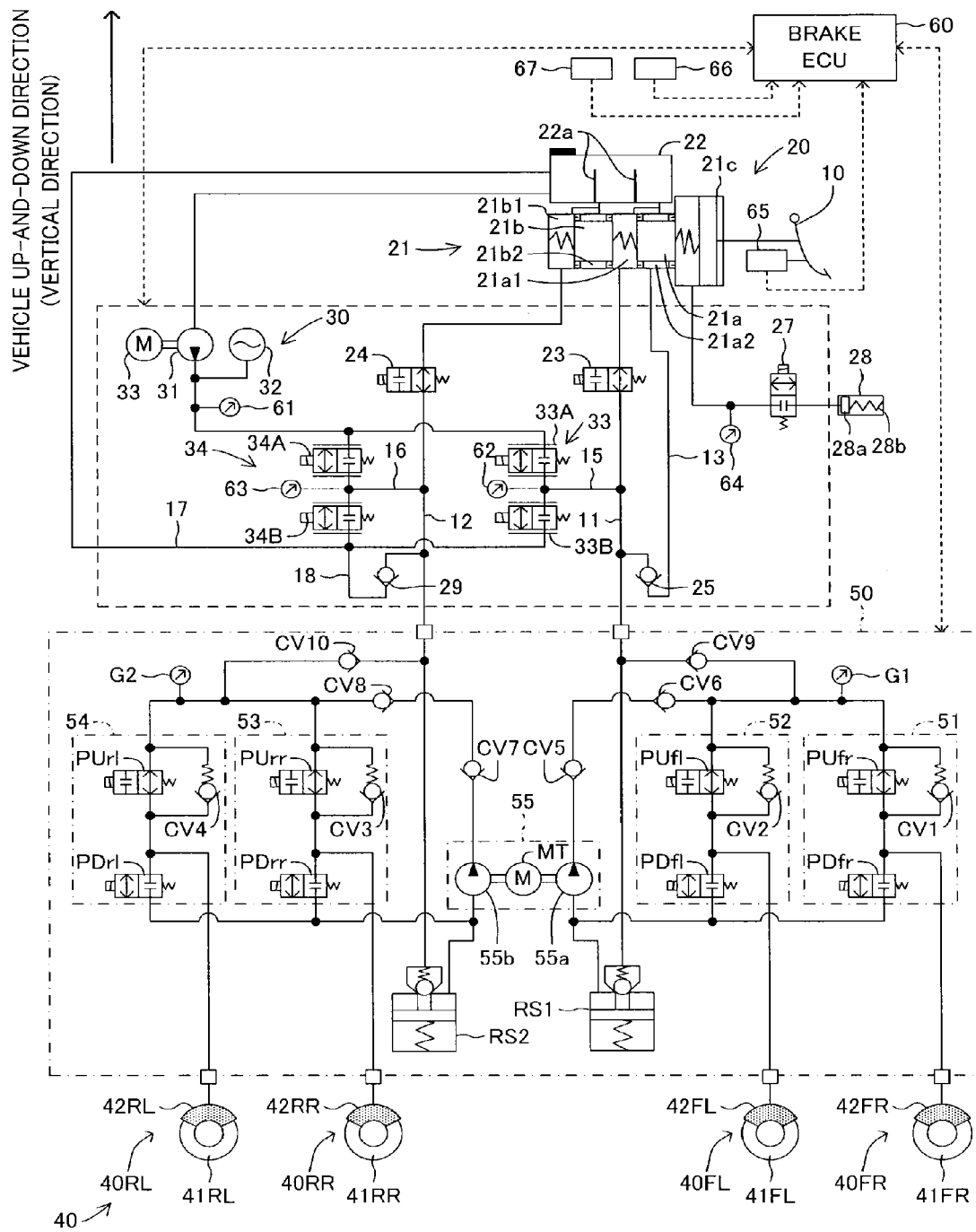
FIG. 7 illustrates a schematic system view of the brake device for the vehicle according to a modified example of the second embodiment of the present invention.
Figure 8:
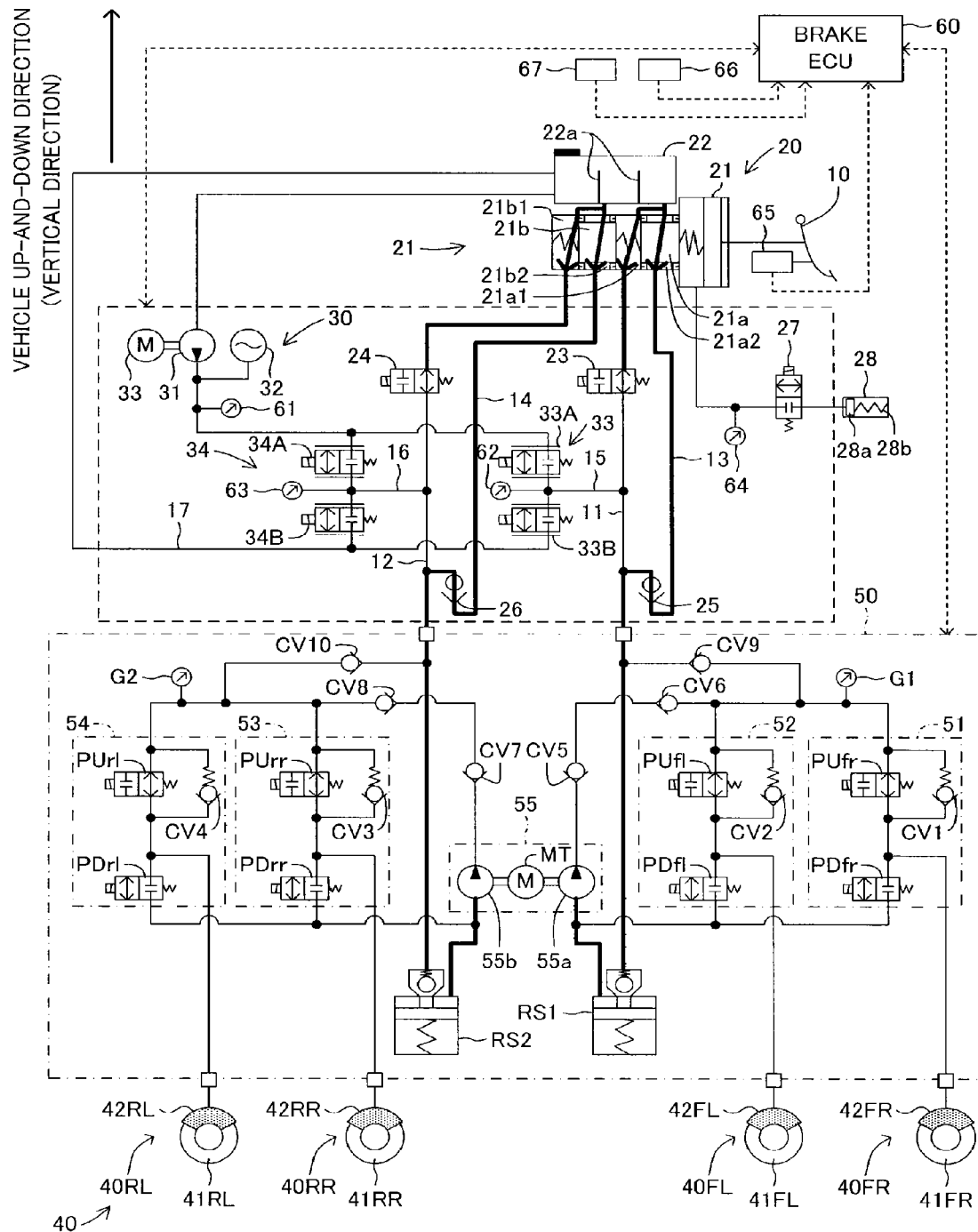
FIG. 8 illustrates a view for describing the behavior control mode according to the modified example of the first embodiment of the present invention.
Figure 9:
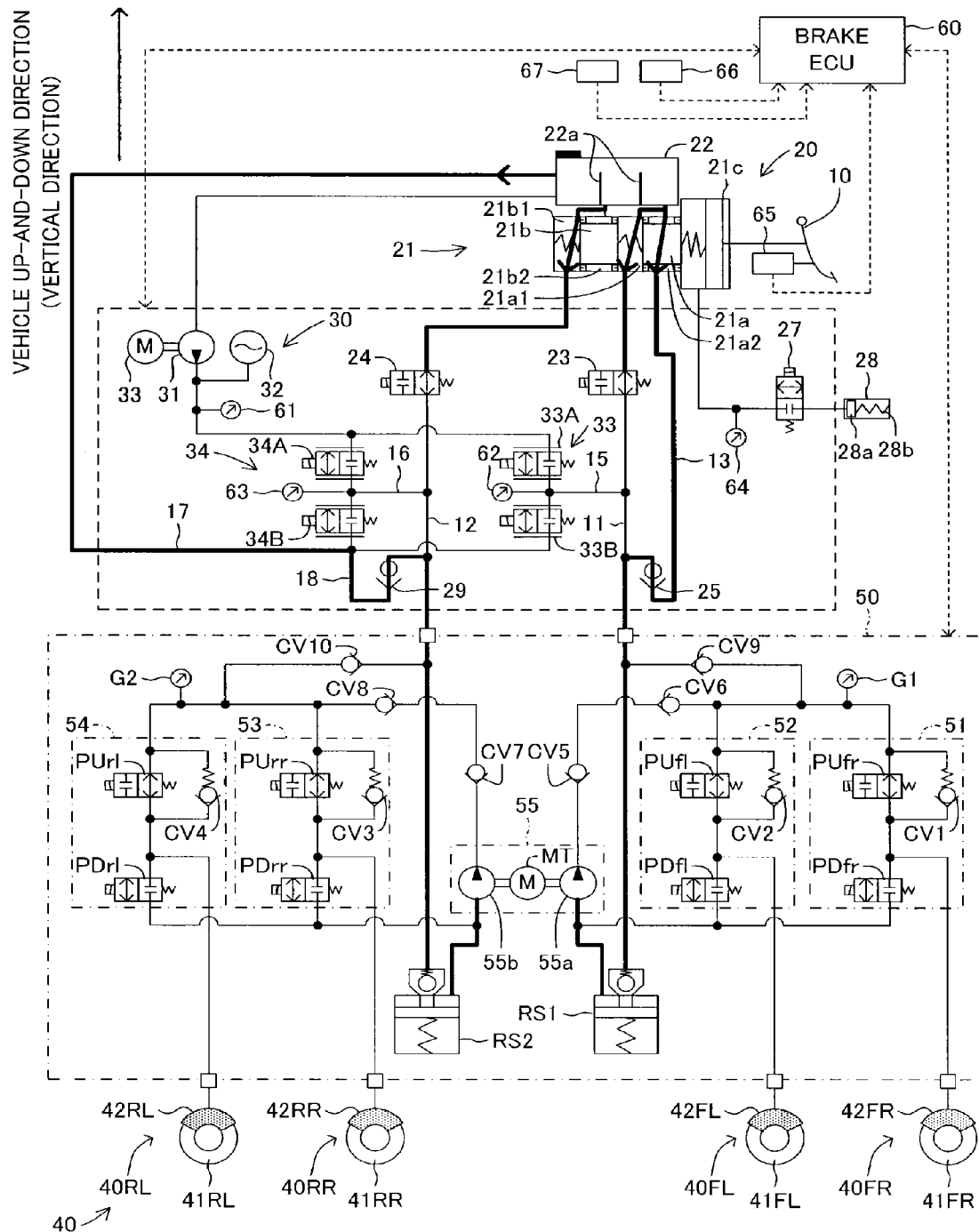
FIG. 9 illustrates a view for describing the behavior control mode according to the modified example of the second embodiment of the present invention.

The check valves 25 and 26 forming the bypass pipe routes according to the first embodiment and the check valve 29 forming the bypass pipe route according to the second embodiment activate to permit only the flow of the brake fluid from the reservoir 22 of the master cylinder unit 20 upstream of the check valves to the brake fluid pressurizing section 55 of the brake fluid pressure control valve device 50 downstream of the check valves and activate to prohibit the flow of the brake fluid to the downstream sides of the check valves to the upstream sides of the check valves. As illustrated in FIGS. 6 and 7, for surely realizing such activations, for example, each of the check valves 25, 26 and 29 may be positioned parallel to a vehicle up-and-down direction (i.e., to a vertical direction). In particular, when each of the check valves 25, 26 and 29 is positioned parallel to the vehicle up-and-down direction (i.e., to a vertical direction), a valve body (or ball) can be always displaced by the gravity acting on the valve body (or ball) in a direction for always seating the valve body (or ball) on a valve seat, in other words, in a direction for always closing the valve. On the other hand, as illustrated in FIGS. 8 and 9, when the brake fluid pressurizing section 55 (in particular, the pumps 55*a* and 55*b*) of the brake fluid pressure control valve device 50 is operated, the valve body (or ball) can be easily displaced away from the valve seat against the gravity by the suction force of the brake fluid pressurizing section 55 and the pumps 55*a* and 55*b* can suction smoothly the brake fluid from the reservoir 22.

Thereby, in the normal control mode, each of the states of the check valves 25, 26 and 29 can be surely maintained at the closed state and the brake fluid (or the brake fluid pressure) pressurized by the brake fluid pressure generation device 30 can be appropriately supplied to the brake fluid pressure control valve device 50. In other words, while the brake fluid (or the brake fluid pressure) pressurized by the brake fluid pressure generation device 30 can be surely prevented from flowing to the bypass pipes 13, 14 and 18 through the check valves 25, 26 and 29, the brake fluid (or the brake fluid pressure) can be surely supplied to the brake fluid pressure control valve device 50 and braking forces can be surely applied to the vehicle wheels, respectively. The other effects are similar to the effects of the first and second embodiments.

The present invention is not limited to the first and second embodiments and the modified example and various modifications can be applied to the present invention without departing from the object of the present invention.

For example, according to the embodiments and the modified example described above, the pump 55*a* constituting the brake fluid pressurizing section 55 of the brake fluid pressure control valve device 50 supplies the pressurized brake fluid (or the brake fluid pressure) to the upstream sides of the FR and FL brake fluid pressure adjust sections 51 and 52 and the pump 55*b* supplies the pressurized brake fluid (or the brake fluid pressure) to the upstream sides of the RR and RL brake fluid pressure adjust sections 53 and 54. In other words, according to the embodiments and the modified example, the brake fluid (or the brake fluid pressure) is independently supplied to the right and left front vehicle wheels of the vehicle and the right and left rear vehicle wheels of the vehicle, respectively.

In this case, for example, the pump 55*a* constituting the brake fluid pressurizing section 55 may be configured to supply the pressurized brake fluid (or the brake fluid pressure) to the upstream sides of the FR and RL brake fluid pressure adjust sections 51 and 54 and the pump 55*b* may be configured to supply the pressurized brake fluid (or the brake fluid pressure) to the upstream sides of the RR and FL brake fluid pressure adjust sections 53 and 52. In this case, braking forces generated by the brake fluid appropriately pressurized can be applied to the diagonal vehicle wheels in terms of the vehicle and, for example, the behavior of the vehicle can be stabilized during the braking.

The invention claimed is:

1. A brake device for a vehicle, comprising:
a reservoir for reserving operation fluid;
wheel cylinders for applying braking force to respective vehicle wheels of the vehicle by a pressure of the operation fluid;
a fluid pressure control valve mechanism for independently controlling the pressure of the operation fluid supplied to the respective wheel cylinders;
a master cylinder for generating the pressure of the operation fluid depending on an operation of a brake pedal;
at least one connection passage for connecting the master cylinder to the fluid pressure control valve mechanism;
at least one shut-off valve provided in the at least one connection passage;
at least one bypass passage which bypasses the at least one shutoff valve and cause the fluid pressure control valve mechanism to be in communication with the reservoir;
at least one one-way valve provided in the at least one bypass passage, the at least one one-way valve allowing only a flow of the operation fluid from the reservoir to the fluid pressure control valve mechanism;
a power-driven type fluid pressure source driven by a predetermined power to supply, to the fluid pressure control valve mechanism, the operation fluid having the pressure depending on the operation of the brake pedal; and
an electronic control unit for controlling an operation of the fluid pressure control valve mechanism and an operation of the power-driven type fluid pressure source,
the electronic control unit is programmed:
to maintain a state of the at least one shut-off valve at a state for shutting off a flow of the operation fluid from the master cylinder to the fluid pressure control valve mechanism when the brake pedal is operated; and
to maintain the state of the at least one shut-off valve at a state for allowing the flow of the operation fluid from the master cylinder to the fluid pressure control valve mechanism when the brake pedal is not operated,
wherein the master cylinder includes:
at least one pressurizing chamber in which the operation fluid is pressurized by at least one pressurizing piston which moves in conjunction with the operation of the brake pedal; and
at least one atmospheric pressure chamber for maintaining the pressure of the operation fluid at the atmospheric pressure,
the at least one pressurizing chamber becomes in communication with the reservoir when the brake pedal is not operated,
the at least one atmospheric pressure chamber is in communication with the reservoir regardless of whether the brake pedal is operated,
the at least one connection passage includes the at least one pressurizing chamber, and
the at least one bypass passage includes the at least one atmospheric chamber.

2. The brake device for the vehicle according to claim 1, wherein the power-driven type fluid pressure source is connected to a recirculation passage for recirculating the operation fluid to the reservoir in order to supply, to the fluid pressure control valve mechanism, the operation fluid having a pressure depending on the operation of the brake pedal, and the at least one bypass passage includes the recirculation passage.

3. The brake device for the vehicle according to claim 2, wherein the reservoir includes fluid chambers defined by a partition wall, and the recirculation passage is in communication with one of the fluid chambers.

4. The brake device for the vehicle according to claim 1, wherein the brake device comprises brake systems for supplying the operation fluid to the respective wheel cylinders, the at least one connection passage comprises a plurality of connection passages, the connection passages are provided corresponding to the respective brake systems, the reservoir includes fluid chambers defined by a partition wall, the at least one bypass passage comprises a plurality of bypass passages, and the bypass passages are provided corresponding to the respective connection passages and are in communication with the respective fluid chambers of the reservoir.

5. The brake device for the vehicle according to claim 1, wherein the at least one one-way valve includes a spherical valve body and a valve seat, the at least one one-way valve is closed by the valve body seating on the valve seat and is opened by the valve body moving away from the valve seat, and the at least one one-way valve is provided in the at least one bypass passage such that the valve body is caused to seat on the valve seat by the gravity.

6. A brake device for a vehicle, comprising:
a reservoir for reserving operation fluid;
wheel cylinders for applying braking force to respective vehicle wheels of the vehicle by a pressure of the operation fluid;
a fluid pressure control valve mechanism for independently controlling the pressure of the operation fluid supplied to the wheel cylinders;
a master cylinder for generating the pressure of the operation fluid depending on an operation of a brake pedal;
at least one connection passage for connecting the master cylinder to the fluid pressure control valve mechanism;
at least one shut-off valve provided in the at least one connection passage;
at least one bypass passage which bypasses the at least one shutoff valve and cause the fluid pressure control valve mechanism to be in communication with the reservoir;
at least one one-way valve provided in the at least one bypass passage, the at least one one-way valve allowing only a flow of the operation fluid from the reservoir to the fluid pressure control valve mechanism;
a power-driven type fluid pressure source driven by a predetermined power to supply, to the fluid pressure control valve mechanism, the operation fluid having the pressure depending on the operation of the brake pedal; and
an electronic control unit for controlling an operation of the fluid pressure control valve mechanism and an operation of the power-driven type fluid pressure source,
the electronic control unit is programmed:
to maintain a state of the at least one shut-off valve at a state for shutting off a flow of the operation fluid from the master cylinder to the fluid pressure control valve mechanism when the brake pedal is operated; and
to maintain the state of the at least one shut-off valve to a state for allowing the flow of the operation fluid from the master cylinder to the fluid pressure control valve mechanism when the brake pedal is not operated,
wherein the power-driven type fluid pressure source is connected to a recirculation passage for recirculating the operation fluid to the reservoir in order to supply, to the fluid pressure control valve mechanism, the operation fluid having a pressure depending on the operation of the brake pedal, and
the at least one bypass passage includes the recirculation passage.

7. The brake device for the vehicle according to claim 6, wherein the brake device comprises brake systems for supplying the operation fluid to the respective wheel cylinders, the at least one connection passage comprises a plurality of connection passages, the connection passages are provided corresponding to the respective brake systems, the reservoir includes fluid chambers defined by a partition wall, the at least one bypass passage comprises a plurality of bypass passages, and the bypass passages are provided corresponding to the respective connection passages and are in communication with the respective fluid chambers of the reservoir.

8. The brake device for the vehicle according to claim 6, wherein the reservoir includes fluid chambers defined by a partition wall, and the recirculation passage is in communication with one of the fluid chambers.

9. The brake device for the vehicle according to claim 6, wherein the at least one one-way valve includes a spherical valve body and a valve seat, the at least one one-way valve is closed by the valve body seating on the valve seat and is opened by the valve body moving away from the valve seat, and the at least one one-way valve is provided in the bypass passage such that the valve body is caused to seat on the valve seat by the gravity.

* * * * *

UNITED STATES PATENT AND TRADEMARK OFFICE
CERTIFICATE OF CORRECTION

| | |
|---|---|
| PATENT NO. | : 9,533,665 B2 |
| APPLICATION NO. | : 14/889737 |
| DATED | : January 3, 2017 |
| INVENTOR(S) | : Kazunori Nimura et al. |

It is certified that error appears in the above-identified patent and that said Letters Patent is hereby corrected as shown below:

On the Title Page

Item (71), the Applicants, and Item (72), the Inventors' information, have been listed incorrectly. Items (71) and (72) should read:

-- (71) Applicants: Kazunori Nimura, Toki (JP); Hiroshi Nakaoka, Okazaki (JP) --

-- (72) Inventors: Kazunori Nimura, Toki (JP); Hiroshi Nakaoka, Okazaki (JP) --

Signed and Sealed this
Third Day of April, 2018

Andrei Iancu
*Director of the United States Patent and Trademark Office*